US009780351B2

(12) United States Patent
Shimoda et al.

(10) Patent No.: US 9,780,351 B2
(45) Date of Patent: Oct. 3, 2017

(54) WIRING MODULE

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventors: Hiroki Shimoda, Mie (JP); Tomoyuki Sakata, Mie (JP); Makoto Higashikozono, Mie (JP); Masakuni Kasugai, Mie (JP); Masato Tsutsuki, Mie (JP); Hiroki Hirai, Mie (JP); Hideo Takahashi, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(*) Notice: Subject to any disclaimer, the term of this patent is extended or adjusted under 35 U.S.C. 154(b) by 30 days.

(21) Appl. No.: 15/032,304

(22) PCT Filed: Oct. 9, 2014

(86) PCT No.: PCT/JP2014/077047
§ 371 (c)(1),
(2) Date: Apr. 26, 2016

(87) PCT Pub. No.: WO2015/064329
PCT Pub. Date: May 7, 2015

(65) Prior Publication Data
US 2016/0254515 A1 Sep. 1, 2016

(30) Foreign Application Priority Data

Oct. 28, 2013 (JP) ................................ 2013-223506
Jan. 21, 2014 (JP) ................................ 2014-008346

(51) Int. Cl.
H01M 2/20 (2006.01)
H01M 10/42 (2006.01)
(Continued)

(52) U.S. Cl.
CPC .......... *H01M 2/206* (2013.01); *H01M 2/1077* (2013.01); *H01M 2/1217* (2013.01);
(Continued)

(58) Field of Classification Search
CPC .. H01M 2/206; H01M 2/1217; H01M 10/482; H01M 2/1077; H01M 10/425; H01M 2/1241; H01M 2220/20
See application file for complete search history.

(56) References Cited

U.S. PATENT DOCUMENTS

2012/0231638 A1 9/2012 Ikeda
2013/0280589 A1 10/2013 Nakayama
(Continued)

FOREIGN PATENT DOCUMENTS

JP 2011228216 A 11/2011
JP 2013105571 A 5/2013
(Continued)

OTHER PUBLICATIONS

International Search Report and Written Opinion for application No. PCT/JP2014/077047 dated Nov. 25, 2014, 5 pages.
(Continued)

*Primary Examiner* — Stewart Fraser
(74) *Attorney, Agent, or Firm* — Reising Ethington, P.C.

(57) ABSTRACT

A battery wiring module that is attachable to an electric cell set configured with a plurality of electric cells that are lined up in a line-up direction, and that have metal terminals, namely a positive electrode and a negative electrode. The battery wiring module includes: a bus bar for electrically connecting the metal terminals of adjacent electric cells to
(Continued)

each other; a resin protector that is made of insulating resin, that has a bus bar holding section for holding the bus bar, and that is attachable to the electric cell set; and an electronic control unit for detecting a state of at least one electric cell. The resin protector is configured to accommodate a tolerance in the line-up direction of the plurality of electric cells, and the electronic control unit is attached to the insulating protector so as to be movable in the line-up direction relative to the insulating protector.

9 Claims, 26 Drawing Sheets

(51) Int. Cl.
  *H01M 2/10* (2006.01)
  *H01M 10/48* (2006.01)
  *H01M 2/12* (2006.01)
(52) U.S. Cl.
  CPC ....... *H01M 10/425* (2013.01); *H01M 10/482* (2013.01); *H01M 2/1241* (2013.01); *H01M 2220/20* (2013.01)

(56) References Cited

U.S. PATENT DOCUMENTS

| | | | |
|---|---|---|---|
| 2014/0065468 A1 | 3/2014 | Nakayama | |
| 2014/0322982 A1* | 10/2014 | Nakayama | H01M 2/20 439/627 |
| 2014/0370342 A1* | 12/2014 | Nakayama | H01M 10/482 429/90 |

FOREIGN PATENT DOCUMENTS

| | | |
|---|---|---|
| JP | 2013152917 A | 8/2013 |
| JP | 2013171746 A | 9/2013 |
| WO | WO2013005515 A1 | 1/2013 |

OTHER PUBLICATIONS

English Translation of International Search Report for application No. PCT/JP2014/077047 dated Nov. 25, 2014, 1 page.
European Search Report for Application No. 14859173.8 Dated Nov. 2, 2016, 5 pages.

* cited by examiner

WIRING MODULE

CROSS REFERENCE TO RELATED APPLICATIONS

This application claims the priority of Japanese patent application JP2013-223506 filed on Oct. 28, 2013, the entire contents of which are incorporated herein.

TECHNICAL FIELD

The present invention relates to a wiring module.

BACKGROUND ART

A battery module for electric cars and hybrid vehicles is configured with an array of a plurality of electric cells having positive and negative electrode terminals. The electrode terminals of the plurality of electric cells are connected by bus bars, and thus the plurality of electric cells are connected in series or parallel.

Here, to simplify the bus bar attachment work, it has been proposed to attach a wiring module, in which bus bars are integrally held by holding members made of insulating resin, to a plurality of electric cells (an electric cell set) all at once. For example, Patent Document 1 (JP2012-199007A) discloses a wiring module having a configuration in which a plurality of bus bar insulating members made of resin are coupled to each other via bus bars. According to the configuration disclosed in Patent Document 1, two bus bar insulating members that are coupled to each other via a bus bar are configured to be movable relative to the bus bar, and thus manufacturing tolerances and assembly tolerances that are provided between the electrode terminals of the plurality of electric cells can be accommodated.

SUMMARY OF INVENTION

Typically, voltage detection terminals are placed on the bus bars connected to the electric cells, in order to detect the voltage across each electric cell. Each voltage detection terminal is connected to one end (the core) of an electric wire, and the other end of the electric wire is led out of the battery module and is connected to an ECU (electronic control unit) or the like, so that the voltage across each electric cell can be detected.

However, in a configuration in which electric wires are connected to an external ECU or the like as described above, the electric wires are routed from the electric cells to the ECU over a long distance, and the electric wires have a high impedance. In addition, there is a concern that the measurement accuracy degrades because the distance to the ECU is different for each electric cell.

Considering the above, it is conceivable to attach the ECU to the wiring module, and thereby reduce the distances over which the electric wires are routed. However, if the ECU is fixed to a wiring module that is configured to be able to accommodate the manufacturing tolerances and the assembly tolerances between the electrode terminals of the plurality of electric cells, the relative movement of the bus bar connection members is restricted by the ECU, and the bus bar connection members cannot accommodate the tolerances. Consequently, there is a concern that a problem might occur when the wiring module is attached to the electric cell set.

The present design has been made in view of the above-described situation, and aims to provide a wiring module that is configured to prevent a problem when the wiring module is attached to an electricity storage element set, even if an electronic control unit has been attached to the wiring module.

One aspect of the present design for solving the above-described problem is a wiring module that is attachable to an electricity storage element set including a plurality of electricity storage elements that are lined up in a line-up direction and that have positive and negative electrode terminals, the wiring module including: a connection member for electrically connecting the electrode terminals of adjacent electricity storage elements out of the plurality of electricity storage elements to each other; a holding member that is made of insulating resin, that has a holding section for holding the connection member, and that is attachable to the electricity storage element set; and an electronic control unit for detecting a state of at least one electricity storage element out of the plurality of electricity storage elements. The holding member is configured to accommodate a tolerance in the line-up direction of the plurality of electricity storage elements, and the electronic control unit is attached to the holding member so as to be movable in the line-up direction relative to the holding member.

According to the configuration above, the electronic control unit is configured to be movable in the line-up direction relative to the holding member. Consequently, even when the electronic control unit has been attached to the holding member, the holding member can be attached to the electricity storage element set so as to be able to accommodate the tolerances in the direction in which the plurality of electricity storage elements are arranged, without being restricted by the electronic control unit from moving.

It is preferable that the wiring module above has the following configurations.

The electronic control unit may include a detection circuit that is housed in a case, the detection circuit being configured to detect a state of at least one of the plurality of electricity storage elements, the case and the holding member may be attached to each other with a locking piece and a locking section, the locking piece being provided on one of the case and the holding member, and the locking section being provided on the other of the case and the holding member, and a clearance may be provided between the locking piece and the locking section, the clearance allowing the case and the holding member to move relative to each other in the line-up direction.

According to the configuration above, the electronic control unit is integrated with the holding member with the locking piece and the locking section provided on the case and the holding member. A clearance is provided between the case and the holding member. Due to the above-described clearance, the electronic control unit can be attached to the holding member so as to be movable in the line-up direction relative to the holding member.

Also, the wiring module may be provided with a duct for allowing gas that is generated inside at least one of the plurality of electricity storage elements to flow and for discharging the gas to the outside, and the electronic control unit may be fixed to the duct.

With this configuration, the electronic control unit is attached to the holding member so as to be movable relative to the holding member, but is fixed to the duct. Therefore, the entire wiring module can be maintained in a stable state.

Furthermore, the duct may be attachable to the electricity storage element set. With this configuration, the wiring module can be more stably attached to the electricity storage element set.

Also, the wiring module may be provided with a plurality of detection members each having; a main portion that is placed on one of the connection members; and a connection piece that is provided integrally with the main portion, and that is connected to the electronic control unit, and the connection piece may have a tolerance accommodating section for accommodating a tolerance in the line-up direction of the plurality of electricity storage elements.

According to the configuration above, even if the detection members and the electronic control unit are connected to each other with the connection pieces that are provided integrally with the detection members, the detection members and the electronic control unit can move relative to each other because the connection pieces each have the tolerance accommodating section for accommodating a tolerance in the line-up direction of the electricity storage elements.

The tolerance accommodating section can be easily manufactured together with the main portion by punch-processing a metal plate material.

Furthermore, the electronic control unit may be provided with a detection circuit substrate on which a detection circuit is formed that is configured to detect a state of at least one of the plurality of electricity storage elements, and the plurality of detection members may be attached to the detection circuit substrate all at once with a positioning member that is configured to hold the connection pieces lined up at predetermined positions. This configuration makes assembly work easier compared to a configuration in which a plurality of detection members need to be individually attached to a detection circuit substrate.

One aspect of the present design provides a wiring module that prevents a problem when the wiring module is attached to an electricity storage element set, even if an electronic control unit has been attached to the wiring module.

DESCRIPTION OF EMBODIMENTS

First Embodiment

Figure 1:
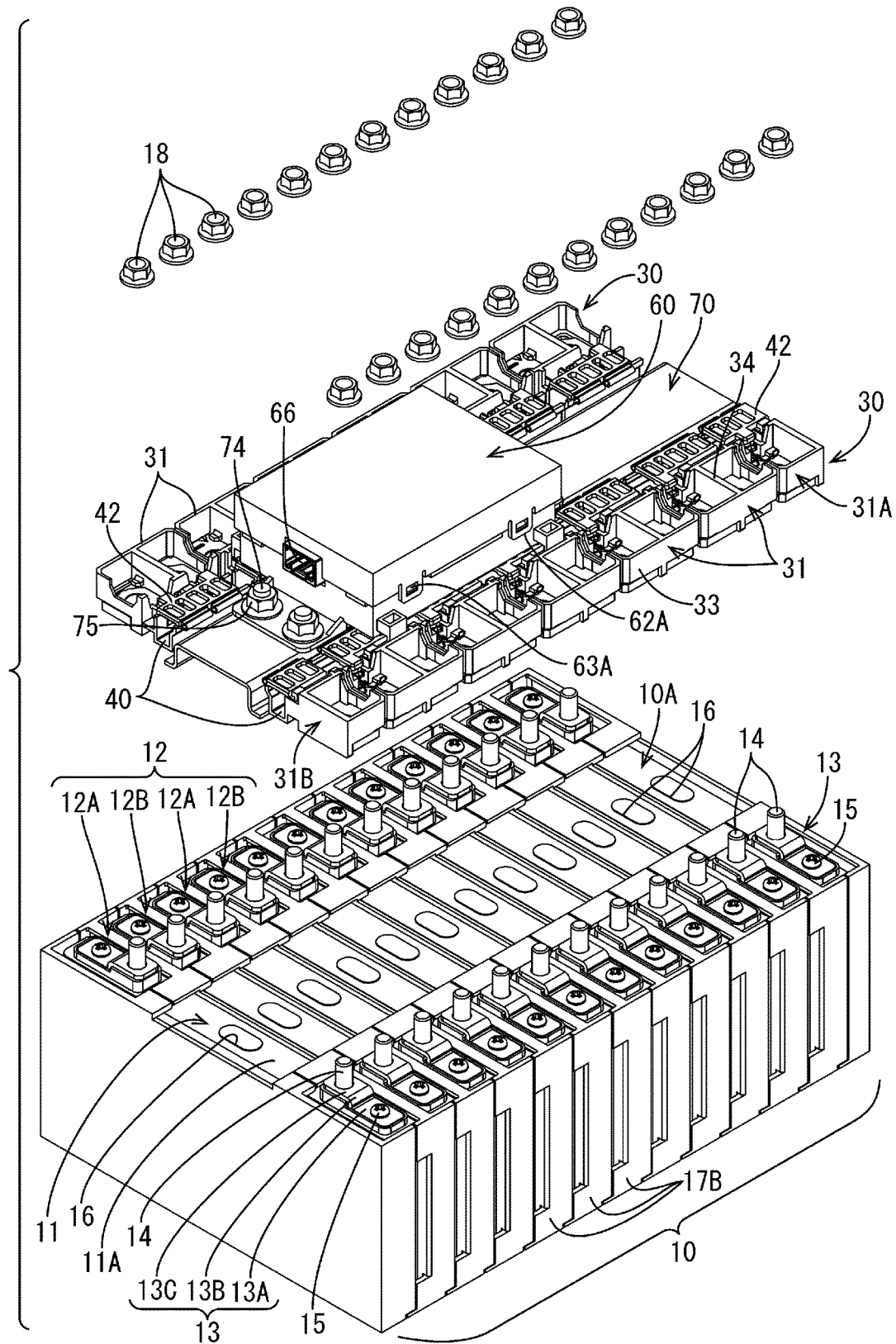
FIG. 1 is an exploded perspective view of a battery module according to a first embodiment.

The following describes a first embodiment with reference to FIG. 1 to FIG. 11. A battery wiring module 20 (an example of a wiring module) according to the present embodiment is, as shown in FIG. 1, attachable to an electric cell set 10 (an example of an electricity storage element set) that is configured with an array of a plurality of (twelve in the present embodiment) electric cells 11 (an example of electricity storage elements) each having electrodes 12, namely a positive electrode 12A and a negative electrode 12B.

Figure 2:
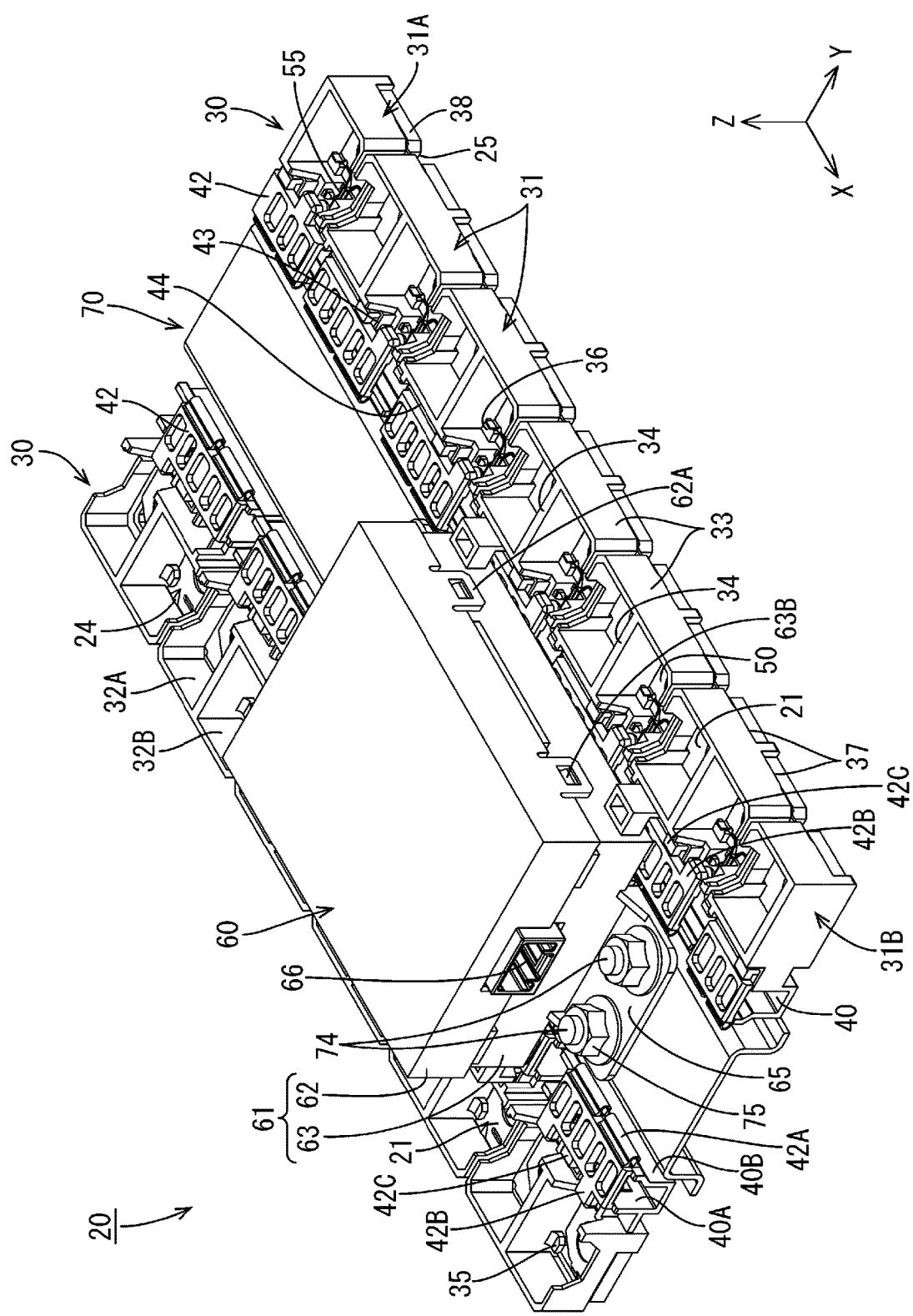
FIG. 2 is a perspective view of a wiring module.

A battery module M configured by attaching the battery wiring module 20 according to the present embodiment to the electric cell set 10 is used as, for example, a drive source for a vehicle (not shown in the drawings) such as an electric car, a hybrid car, or the like. The plurality of electric cells 11 that constitute the electric cell set 10 are connected in series by electrically connecting the positive electrode 12A of one electric cell 11 to the negative electrode 12B of another electric cell 11, using the battery wiring module 20. In the following description, the X direction shown in FIG. 2 is referred to as the forward direction, and the direction opposite to the X direction is referred to as the backward direction. Also, the Y direction shown in FIG. 2 is referred to as the rightward direction, and the direction opposite to the Y direction is referred to as the leftward direction. Furthermore, the Z direction shown in FIG. 2 is referred to as the upward direction, and the direction opposite to the Z direction is referred to as the downward direction.

Each electric cell 11 is configured with an electricity storage element housed within a case, and has a flat cuboid shape. The electricity storage element is not shown in the drawings. An upper surface 11A of each electric cell 11 is, as shown in FIG. 1, provided with the positive electrode 12A and the negative electrode 12B that are electrically connected to the electricity storage element. In the following description, the positive electrode 12A and the negative electrode 12B are collectively referred to as the electrodes 12.

The electrodes 12 are each provided with: a metal terminal 13 (an example of an electrode terminal); an electrode post 14 that is round rod-shaped and extends upward; and a round screw 15 that fixes the metal terminal 13 to the case. The metal terminal 13 is approximately Z-shaped in a side view. More specifically, the metal terminal 13 has: a fixed piece 13A that is to be fixed to the case of the electric cell 11; a connection piece 13B that forms a right angle with the fixed piece 13A and extends in the direction away from the case; and a terminal piece 13C that extends parallel to the fixed piece 13A and is continuous with the connection piece 13B. The fixed piece 13A and the terminal piece 13C are each provided with a through hole. The round screw 15 penetrates through the through hole of the fixed piece 13A, and the electrode post 14 penetrates through the through hole of the terminal piece 13C. Note that a screw thread (not shown in the drawings) is formed on the surface of the electrode post 14.

The plurality of electric cells 11 are arranged such that the electrodes 12 of adjacent electric cells 11 have different polarities (i.e., the positive electrodes 12A and the negative electrodes 12B are arranged one after the other). The electrode post 14 is configured to be inserted into a terminal through hole 22 of a bus bar 21 described below (an example of a connection member), and to be fixed to the bus bar 21 with a nut 18 screwed onto it.

Also, an approximately central portion of the upper surface 11A of each electric cell 11 is provided with a gas discharge section 16 that discharges gas generated inside the electric cell 11 to the outside.

Figure 11:
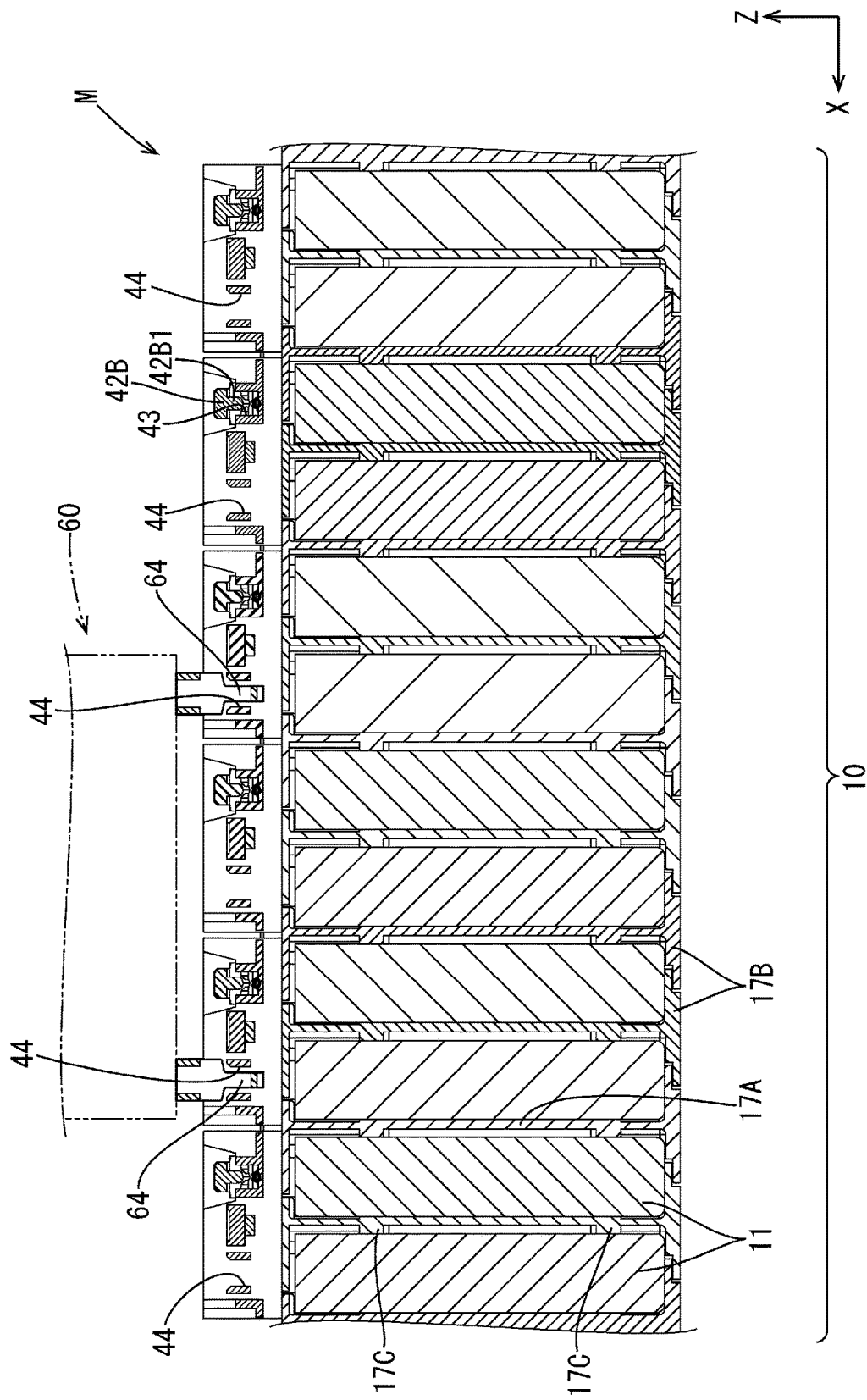
FIG. 11 is a cross-sectional view along a line D-D shown in FIG. 10.

As shown in FIG. 1 and FIG. 11, the electric cells 11 are arranged to be separated from each other by separators 17 that are provided between adjacent electric cells 11. The separators 17 are made of synthetic insulating resin. Each separator 17 is provided with: a partition wall 17A that is arranged between adjacent electric cells 11 so as to separate the electric cells 11 from each other; and extension walls 17B that extend from the upper and lower edge portions of the partition wall 17A, in the left-right direction (the X-axis direction) shown in FIG. 11. Each electric cell 11 is housed within a space surrounded by partition walls 17A and extension walls 17B. Note that, out of the extension walls 17B, the extension walls 17B that face the upper surfaces 11A of the electric cells 11 have been partially cut out, and are designed such that the metal terminals 13 and the gas discharge sections 16 are exposed to the outside (see FIG. 1).

Also, a pair of ribs 17C that protrude leftward in FIG. 11 (in the X-axis direction) and parallel to each other are provided on each partition wall 17A at two positions along the height direction. These ribs 17C come into contact with the side surfaces of the electric cells 11, and thus predetermined clearances are provided between the electric cells 11 and the partition walls 17A. Note that the separators 17 arranged at the end portions of the electric cell set 10 are not provided with the extension walls 17B or the ribs 17C that extend outward.

The battery wiring module 20 is attachable to an approximately central portion of an upper surface 10A (an electrode surface) of the electric cell set 10.

Figure 3:
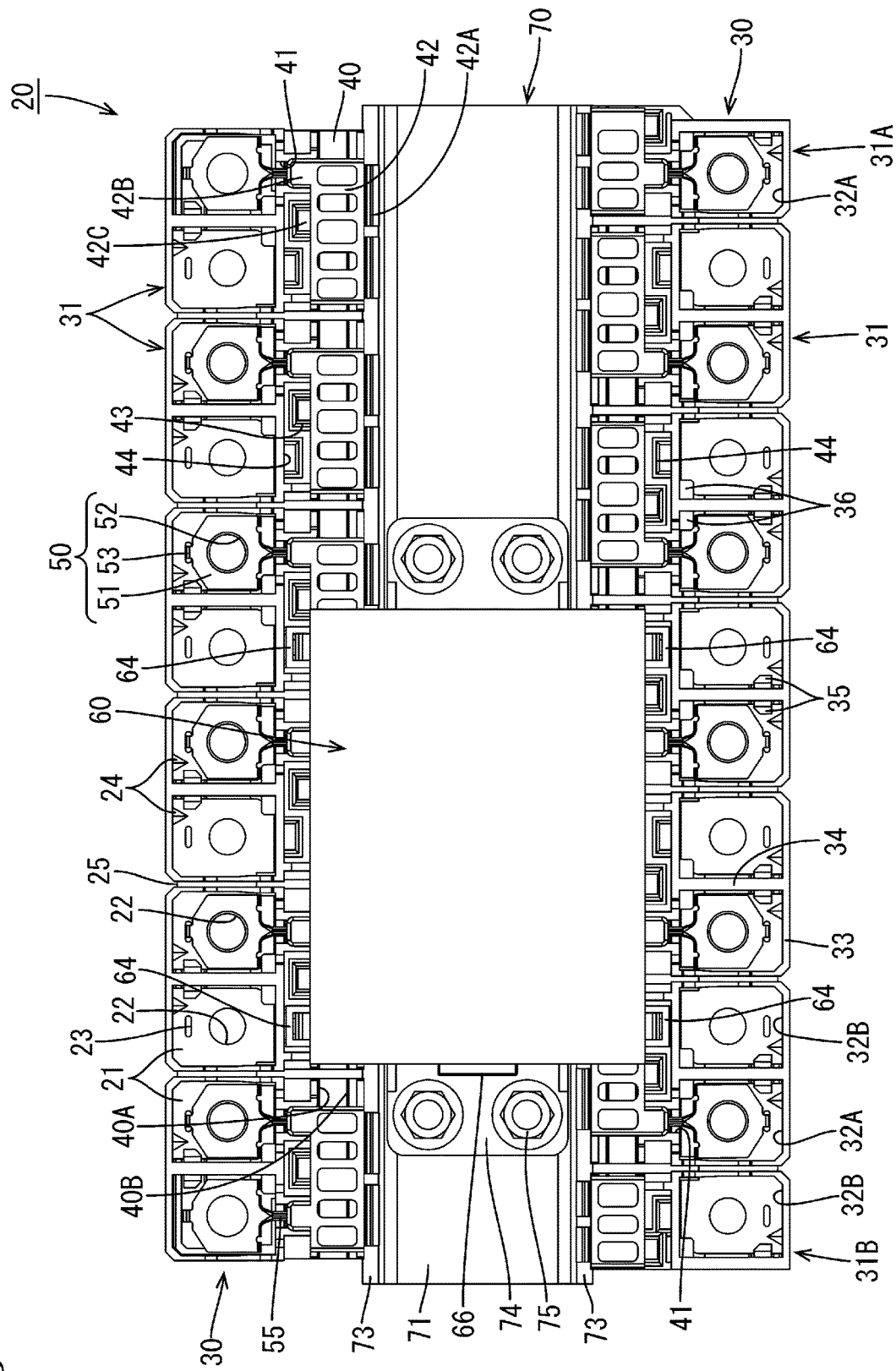
FIG. 3 is a plan view of the wiring module.

The battery wiring module 20 is, as shown in FIG. 2 and FIG. 3, provided with: a plurality of bus bars 21 that are to be connected to the electrodes 12 of the electric cells 11; resin protectors 30 (an example of holding members) having bus bar holding sections 32 that hold the bus bars 21; voltage detection terminals 50 that are placed on and electrically connected to the bus bars 21; detection electric wires 55 that are connected to the voltage detection terminals 50; and a duct 70 that discharges gas that has been generated inside the electric cells 11 to the outside.

The bus bars 21 are formed by press-processing a metal plate material made of copper, a copper alloy, stainless steel (SUS), aluminium, or the like, and have an approximately rectangular shape as a whole. The surfaces of the bus bar 21 may be plated with metal such as tin or nickel.

As shown in FIG. 3, each bus bar 21 is provided with a pair of circular terminal through holes 22 that penetrate through the bus bar 21, and into which the electrode posts 14 of the electrodes 12 can be inserted. The terminal through holes 22 are designed to have a slightly larger diameter than the electrode posts 14. In the situation where the electrode posts 14 have been inserted into the terminal through holes 22, the nuts 18 are screwed onto the electrode posts 14 so that the bus bars 21 are interposed between the nuts 18 and the terminal pieces 13C of the metal terminals 13, and thus the electrodes 12 and the bus bars 21 are electrically connected.

Each bus bar 21 has a pair of slits 23 that are formed along a long side of the bus bar 21, next to the terminal through holes 22. These slits 23 are for interlocking the voltage detection terminals 50 described below with the bus bars 21.

Also, anti-dislodgement protrusions 24 for preventing the bus bars 21 from dislodging from coupling units 31 described below are formed such that two anti-dislodgement protrusions 24 respectively protrude from edge portions of the plate surface of each bus bar 21, the edge portions being located near the two ends of the long side on the slits 23 side, out of the pair of long sides of the bus bar 21. The anti-dislodgement protrusions 24 are each provided with a triangular shape when seen from above.

Also, recesses 25, which each have been cut out in the shape of a rectangle, are formed in respective central edge portions, in the lengthwise direction, of the pair of long sides of each bus bar 21. Out of these recesses 25, a recess 25 that is provided in the long side that is opposite to the long side on which anti-dislodgement protrusions 24 are provided (not shown in the drawings) is configured to be interlocked with a locking protrusion (not shown in the drawings) of a coupling unit 31 described below.

The resin protectors 30 made of insulating resin material are formed by coupling a plurality of coupling units 31 to one another by using the bus bars 21, and are elongate in the direction along which the plurality of electric cells 11 are arranged (the X-axis direction). The resin protectors 30 are configured to be attachable to the electric cell set 10.

Coupling units 31 are, as shown in FIG. 2 and FIG. 3, each provided with: a pair of bus bar holding sections 32A and 32B (examples of holding sections) that are open upward and that house and hold a bus bar 21; and an electric wire housing groove 40 that houses detection electric wires 55 that are connected to a voltage detection terminal 50 described below. Out of each pair of bus bar holding sections 32A and 32B, the bus bar holding section 32A houses a voltage detection terminal 50 described below as well as a bus bar 21, and the bus bar holding section 32B houses only a bus bar 21. In the following description, the bus bar holding sections 32A and 32B are collectively denoted as the bus bar holding sections 32. Note that end portion coupling units 31A and 31B, each having only a bus bar holding section 32A or 32B, are arranged at the front and rear end portions of the resin protector 30 on the right side in FIG. 2.

Each bus bar holding section 32 is surrounded by a peripheral wall 33 and a partition wall 34 that is located between the pair of bus bar holding sections 32A and 32B, and each bus bar holding section 32 has a size for housing approximately half a bus bar 21.

As shown in FIG. 3, approximately half a bus bar 21 is held in each bus bar holding section 32 of a coupling unit 31. One coupling unit 31 and its adjacent coupling unit 31, out of the plurality of coupling units 31, are coupled to each other via a single bus bar 21. Bus bars 21 that are adjacent to each other are separated and insulated from each other by a partition wall 34.

A bottom portion of each bus bar holding section 32 is open downward, leaving a mounting section 38 (see FIG. 7) on which a peripheral portion of a bus bar 21 can be placed. Also, as shown in FIG. 2 and FIG. 3, a pair of holding protrusions 35 and a pair of holding protrusions 36 are formed on each partition wall 34, protruding toward the inside of the corresponding bus bar holding section 32. The pair of holding protrusions 35 and the pair of holding protrusions 36 are located above the bus bar 21 housed within the bus bar holding section 32, and have the function of holding the bus bar 21 together with the mounting section 38.

A bus bar insertion port 37 is formed in the peripheral wall 33 of each bus bar holding section 32 so that a bus bar 21 can be inserted into the bus bar holding section 32 from the bus bar insertion port 37 (see FIG. 2).

Also, each coupling unit 31 is provided with an electric wire housing groove 40 in which detection electric wires 55 to be connected to a voltage detection terminal 50 described below are housed. The electric wire housing groove 40 extends along the direction in which a pair of bus bar holding sections 32A and 32B are arranged (the X-axis direction). A plurality of detection electric wires 55 can be housed within the electric wire housing groove 40. Out of a pair of groove wall sections 40A and 40B of each electric wire housing groove 40, a groove wall section 40A, which is on the bus bar holding section 32 side, and the peripheral wall 33 of each bus bar holding section 32A, are both partially cut out, and are configured to be in communication with a groove-shaped barrel holding section 41 that is located between the electric wire housing groove 40 and the bus bar holding section 32A, and that holds a barrel section (not shown in the drawings) of a voltage detection terminal 50 described below.

The groove wall sections 40B of the electric wire housing grooves 40, which are located on the side opposite to the bus bar holding section 32, are provided with a plurality of lid sections 42 located near the upper ends of the outer surfaces of the groove wall sections 40B. Each of the plurality of lid sections 42, which covers a portion of an electric wire housing groove 40 from above and prevents the detection electric wires 55 from running off the electric wire housing groove 40, can be opened and closed by being rotated about a hinge 42A. A bulging section 42B that bulges toward a bus bar holding section 32A is formed on a part of the tip (the edge portion) of each lid section 42 corresponding to a barrel holding section 41, making it possible to close the barrel holding section 41 from above. A pressing section 42B1 protrudes from the lower surface of each bulging section 42B (see FIG. 6).

Also, a part of a front end surface of each lid section 42 corresponding to a partition wall 34 is provided with an engagement claw 42C that protrudes toward the partition wall 34 and extends downward. The engagement claws 42C are engaged with engagement holes 43 provided in the outer surfaces of the groove wall sections 40A on the bus bar holding sections 32 side so that the lid sections 42 close portions of the electric wire housing grooves 40 from the open surface side (the upper surface side).

Furthermore, the outer surface of a portion of the peripheral wall 33 of each bus bar holding section 32 located on the electric wire housing groove 40 side is provided with locking holes 44 (an example of locking sections) with which locking pieces 64 of the electronic control unit 60 described below can be interlocked. The locking holes 44 are provided on the outer surfaces of the bus bar holding sections 32B, which each house only a bus bar 21.

Figure 7:
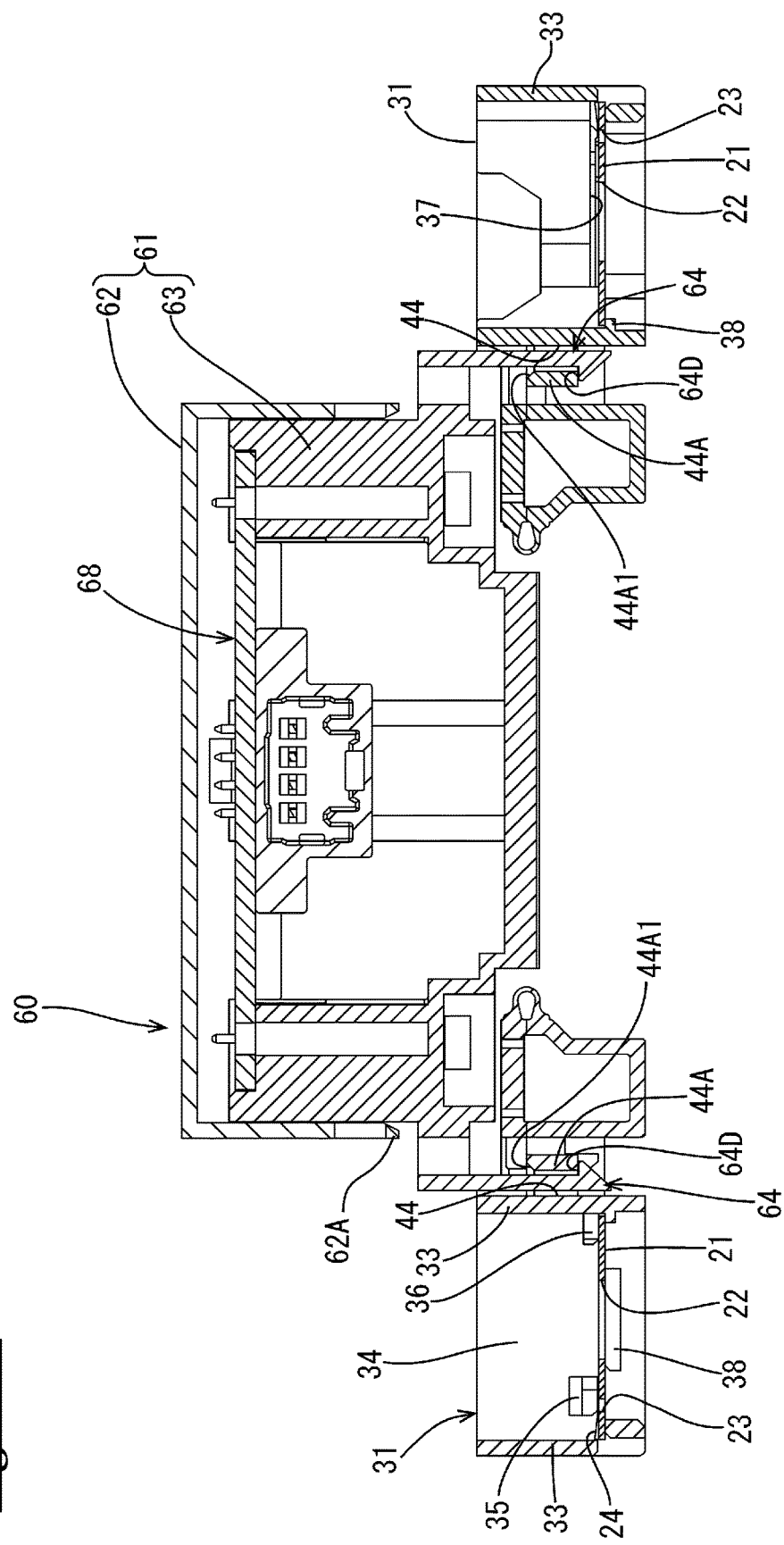
FIG. 7 is a cross-sectional view along a line B-B shown in FIG. 5.

A handle-shaped hole wall 44A extends from the outer surface of each peripheral wall 33, and thus the locking holes 44 are each configured as a rectangular hole. As shown in FIG. 7, the upper surfaces of the hole walls 44A are designed to be located lower than the upper surfaces of the peripheral walls 33, and the lower surfaces of the hole walls 44A are designed to be located higher than the lower surfaces of the peripheral walls 33. Also, a bevelled section 44A1 is formed on the inner edge of the upper surface of each hole wall 44A.

Figure 6:
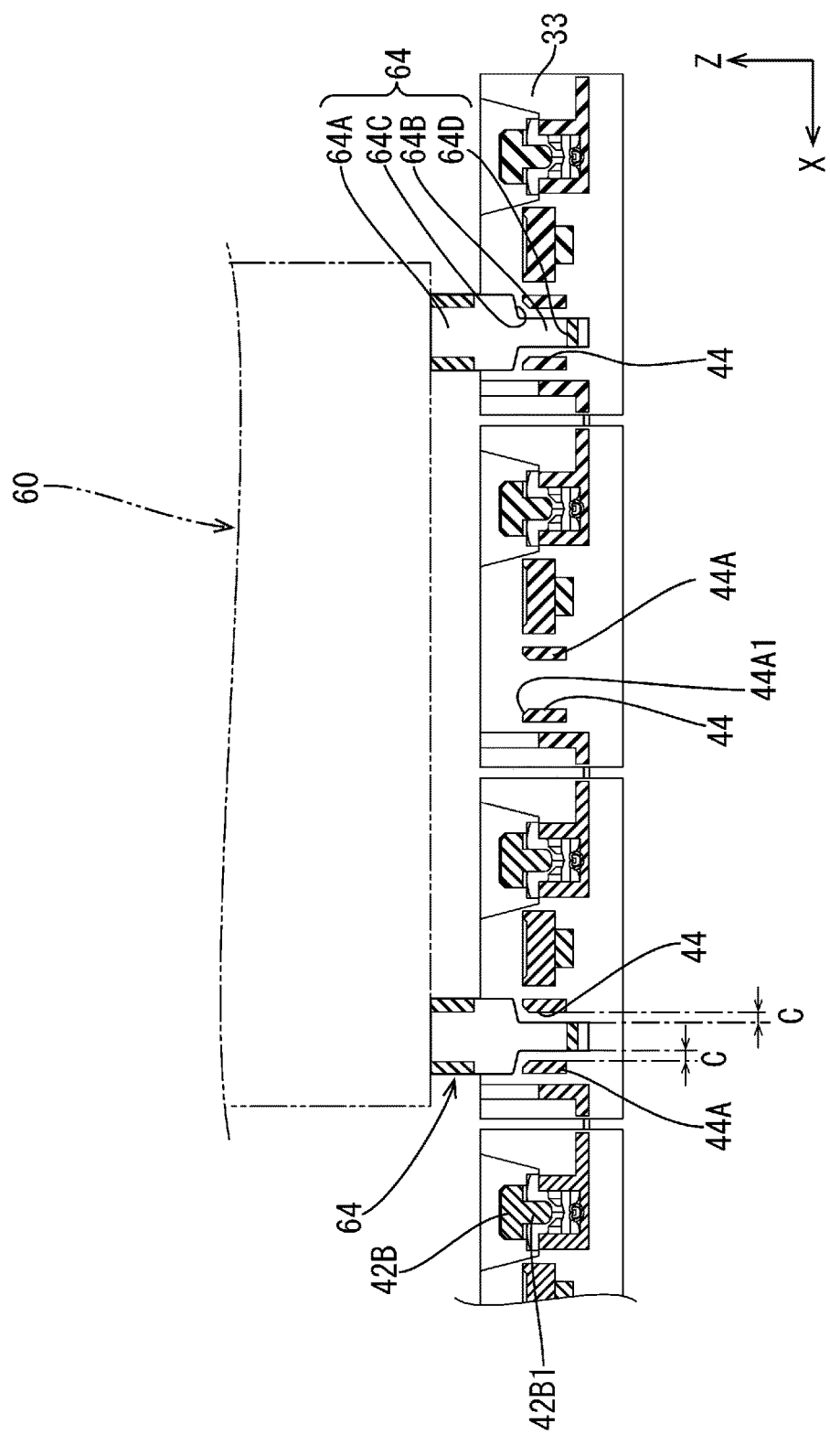
FIG. 6 is a cross-sectional view along a line A-A shown in FIG. 5.

The length of the locking holes 44 in the left-right direction (the Y-axis direction) is, as shown in FIG. 7, designed such that claw sections 64D of the locking pieces 64 of the electronic control unit 60 described below can be inserted into the locking holes 44, and can be interlocked with the lower surfaces of the hole walls 44A. Also, as shown in FIG. 6, the length of the locking holes 44 in the front-rear direction (the X-axis direction) is designed such that small-width sections 64B of the locking pieces 64 that are also described below can be inserted into the locking holes 44, while providing clearances C that allow the small-width sections 64B to move in the front-rear direction (the X-axis direction) within the locking holes 44. Note that the length of the locking holes 44 in the front-rear direction (the X-axis direction) is designed such that large-width sections 64A cannot be inserted into the locking holes 44.

Adjacent coupling units 31 are movable in the direction in which the plurality of electric cells 11 are arranged (the X-axis direction), relative to the bus bar 21. Consequently, in the direction in which the plurality of electric cells 11 are arranged, the manufacturing tolerances and the assembly tolerances provided between adjacent electrodes 12 can be accommodated.

A voltage detection terminal 50 for detecting the voltage across an electric cell 11 is arranged within one of the bus bar holding sections, namely the bus bar holding section 32A, of each coupling unit 31, and is placed on the bus bar 21. The voltage detection terminals 50 are provided with a predetermined shape by press-processing a metal plate material made of copper, a copper alloy, stainless steel, aluminium, or the like. The surfaces of the voltage detection terminals 50 may be plated with metal such as tin or nickel.

In the present embodiment, as shown in FIG. 3, each voltage detection terminal 50 is provided with: a terminal main portion 51 having an approximately pentagonal shape; and a barrel section (not shown in the drawings) that extends from the terminal main portion 51 and is connected to the core of a detection electric wire 55.

A terminal insertion hole 52, into which an electrode post 14 is inserted, is formed near the center of the terminal main portion 51, overlapping the terminal through hole 22 of the bus bar 21. The diameter of the terminal insertion holes 52 is designed to be slightly larger than the diameter of the electrode posts 14, and to be slightly larger than the diameter of the terminal through holes 22 of the bus bars 21 as well. Also, the terminal main portion 51 is provided with an insertion section 53 that is inserted into a slit 23 of the bus bar 21 described above so as to interlock the voltage detection terminal 50. The insertion section 53 is located at the edge portion on the side opposite to the barrel section.

The voltage detection terminals 50 are interposed between a nut 18 and a bus bar 21, and is thus electrically connected to electrodes 12. The opposite end portion of the detection electric wire 55 connected to the barrel section is connected to the electronic control unit 60 described below, and thus the voltage across each electric cell 11 is detected by the electronic control unit 60.

Figure 4:
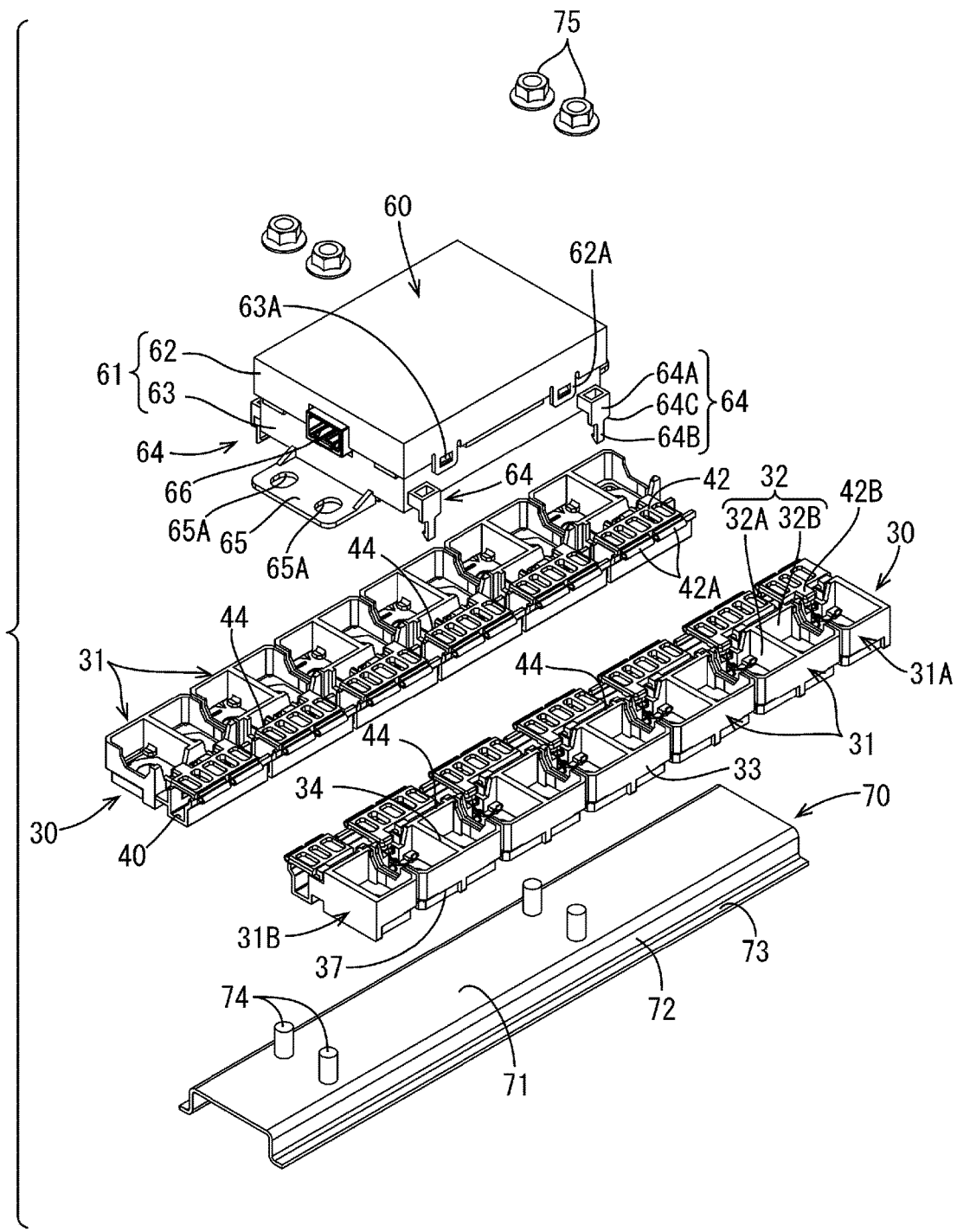
FIG. 4 is an exploded perspective view of the wiring module.
Figure 5:
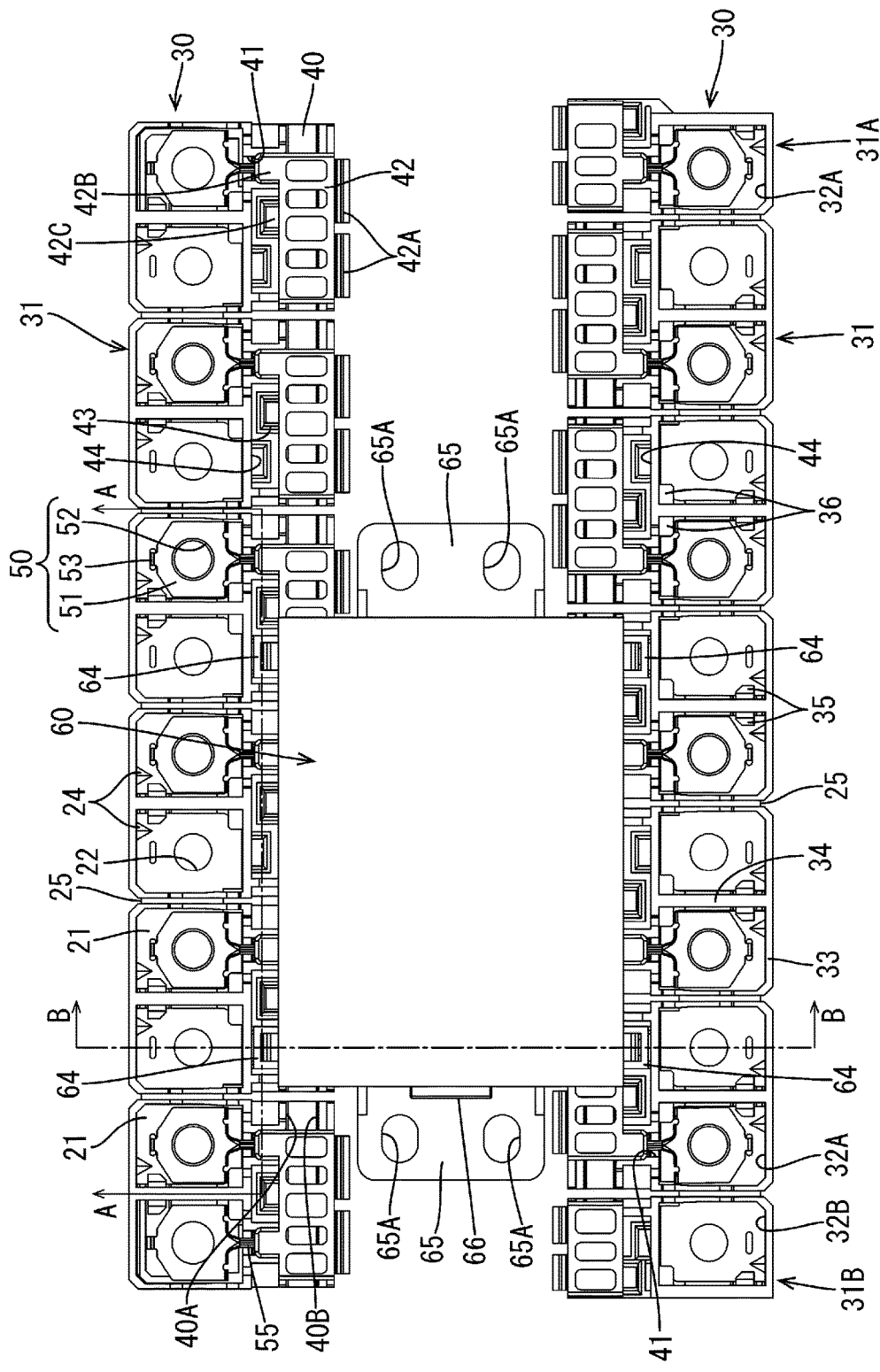
FIG. 5 is a plan view showing a situation in which an electronic control unit has been attached to resin protectors.

The electronic control unit 60 is arranged between the pair of resin protectors 30 that couple the above-described coupling units 31 to one another. As shown in FIG. 4, the electronic control unit 60 is configured with a detection circuit substrate 68 on which a microcomputer, components, and the like are mounted and that is housed in an approximately cuboid case 61. The electronic control unit 60 has a well-known configuration provided with the functions of, for example, monitoring and controlling the electric cells 11 by detecting the voltage, current, temperature, or the like of at least one electric cell 11 out of the plurality of electric cells 11.

The case 61 is configured with: an upper case 62 that has the shape of an approximately rectangular box having an opening in the lower surface; and a lower case 63 that has the shape of an approximately rectangular box having an opening in the upper surface. These cases have been attached to each other by engaging engagement pieces 62A provided on the upper case 62 with engagement protrusions 63A provided on the lower case.

The locking pieces 64 (an example of locking pieces) that bulge outward and protrude downward are provided near two edges of each side surface of the lower case 63 in the longitudinal direction along the front-rear direction (the X-axis direction). Each locking piece 64 has an inverted T-shape in a plane along the front-rear direction (the X-axis direction). In the following description, the upper portion thereof is referred to as a large-width section 64A, the lower portion is referred to as a small-width section 64B, and a stepped section between the large-width section 64A and the small-width section 64B is referred to as a stepped section 64C. A claw section 64D (see FIG. 7) that protrudes inward in the left-right direction (the Y-axis direction) is provided at the lower end of the small-width section 64B.

Each locking piece 64 is locked within a locking hole 44 (an example of a locking section) of the above-described resin protectors 30 (the coupling units 31), and thus the electronic control unit 60 is attached to the resin protectors 30 so as to be integrated into one piece.

Also, as shown in FIG. 4, a pair of plate-shaped attaching sections 65 extend from the bottom section of the lower case 63 toward opposite sides along the front-rear direction (the X-axis direction). A pair of attaching holes 65A are provided in each attaching section 65. These attaching holes 65A each have an elongated hole shape extending along the front-rear direction (the X-axis direction).

Furthermore, a connector section 66 that can be fit to a connector (not shown in the drawings) that is connected to the terminals of the detection electric wires 55 is provided on the front surface of the case 61.

A duct 70 that discharges gas that has been generated in at least one electric cell 11 out of the plurality of electric cells 11 to the outside is provided between the pair of resin protectors 30 and below the electronic control unit 60. The duct 70 is made of synthetic resin material, and has an approximately recess-shaped cross section, provided with: a top panel section 71 having an elongated plate shape; a pair of side wall sections 72 that extend downward from two side edge portions of the top panel section 71 along the front-rear direction (the X-axis direction); and contacting sections 73 that extend outward from the lower edge portions of the pair of side wall sections 72 in parallel with the top panel section 71. The length of the top panel section 71 in the rear-front direction is designed to be equivalent to the length of the electric cell set 10 in the line-up direction.

Also, two pairs of round rod-shaped attaching protrusions 74 that are to be inserted into the attaching holes 65A of the electronic control unit 60 are formed on the upper surface of the top panel section 71, protruding upward. A thread is formed on the outer circumferential surface of each attaching protrusion 74, and the electronic control unit 60 and the duct 70 are integrated into one piece with nuts 75 screwed onto the threads.

The gas discharged from the gas discharge sections 16 of the electric cells 11 is discharged to the outside of the battery module M via a ventilation space formed by the duct 70.

Next, a description is given of a method for assembling the battery wiring module 20.

First, a predetermined number of coupling units 31 are prepared, and then the bus bars 21 are inserted into the bus bar holding sections 32 from the bus bar insertion ports 37 so that the plurality of coupling units 31 are brought into a coupled state (see FIG. 4). In this state, the resin protectors 30 thus formed are configured to be expandable in the coupling direction of the coupling units 31 (the X-axis direction), and to be able to accommodate the tolerances in the direction in which the plurality of electric cells 11 are arranged (the X-axis direction) when the resin protectors 30 are attached to the electric cell set 10.

Next, the barrel sections (not shown in the drawings) of the voltage detection terminals 50 are crimped to end portions of the detection electric wires 55, and the voltage detection terminals 50 are inserted from above, into the bus bar holding sections 32A and placed on the bus bars 21. Those bus bar holding sections 32A out of the pairs of bus bar holding sections 32A and 32B that are formed on the coupling units 31 are coupled to the barrel holding sections 41. At this stage, the insertion sections 53 of the voltage detection terminals 50 are inserted into the slits 23 of the bus bars 21 and brought into an interlocked state. The barrel sections of the voltage detection terminals 50 as well as the detection electric wires 55 are held within the barrel holding sections 41 of the coupling units 31. The detection electric wires 55 led out from the barrel holding sections 41 of the coupling units 31 are guided to the inside of the electric wire housing grooves 40 and are accommodated therein. Thereafter, the lid sections 42 are rotated and the engagement claws 42C are inserted into the engagement holes 43, and thus the open surfaces (the upper surfaces) of the electric wire housing grooves 40 are closed.

Next, the electronic control unit 60 is attached between the pair of resin protectors 30 assembled in the above-described manner. Specifically, as shown in FIG. 4, the electronic control unit 60 is brought closer to the pair of resin protectors 30 from above, and the two pairs of locking pieces 64 of the electronic control unit 60 are inserted into the locking holes 44 of the resin protectors 30. Consequently, as shown in FIG. 7, the lower surfaces of the claw sections 64D of the locking pieces 64 advance to the inside of the locking holes 44 while being guided by the bevelled sections 44A1 of the hole walls 44A, and when reaching deep down, the claw sections 64D are interlocked with the lower surfaces of the hole walls 44A. Thus, the locking pieces 64 are brought into an anti-dislodgement state within the locking holes 44, and the pair of resin protectors 30 and the electronic control unit 60 are integrated into one piece (see FIG. 5 to FIG. 7).

At this stage, the electronic control unit 60 is provided with the clearances C that allow the electronic control unit 60 to move in the front-rear direction (the X-axis direction) relative to the resin protectors 30. That is to say, the electronic control unit 60 is attached to the resin protectors 30 so as to be able to move within the range corresponding to the above-described clearances C in the direction along the coupling direction of the coupling units 31 (the X-axis direction) relative to the resin protectors 30 because, as shown in FIG. 6, the inner diameter of the locking holes 44 in the X-axis direction is designed to be larger than the length of the small-width sections 64B of the locking pieces 64 in the X-axis direction.

Note that, at this stage, the stepped sections 64C come into contact with the upper surfaces of the hole walls 44A, and the locking pieces 64 are thereby restricted from being excessively inserted into the locking holes 44 because the inner diameter of the locking holes 44 in the X-axis direction is designed such that the large-width sections 64A of the locking pieces 64 cannot be inserted into the locking holes 44.

Figure 8:
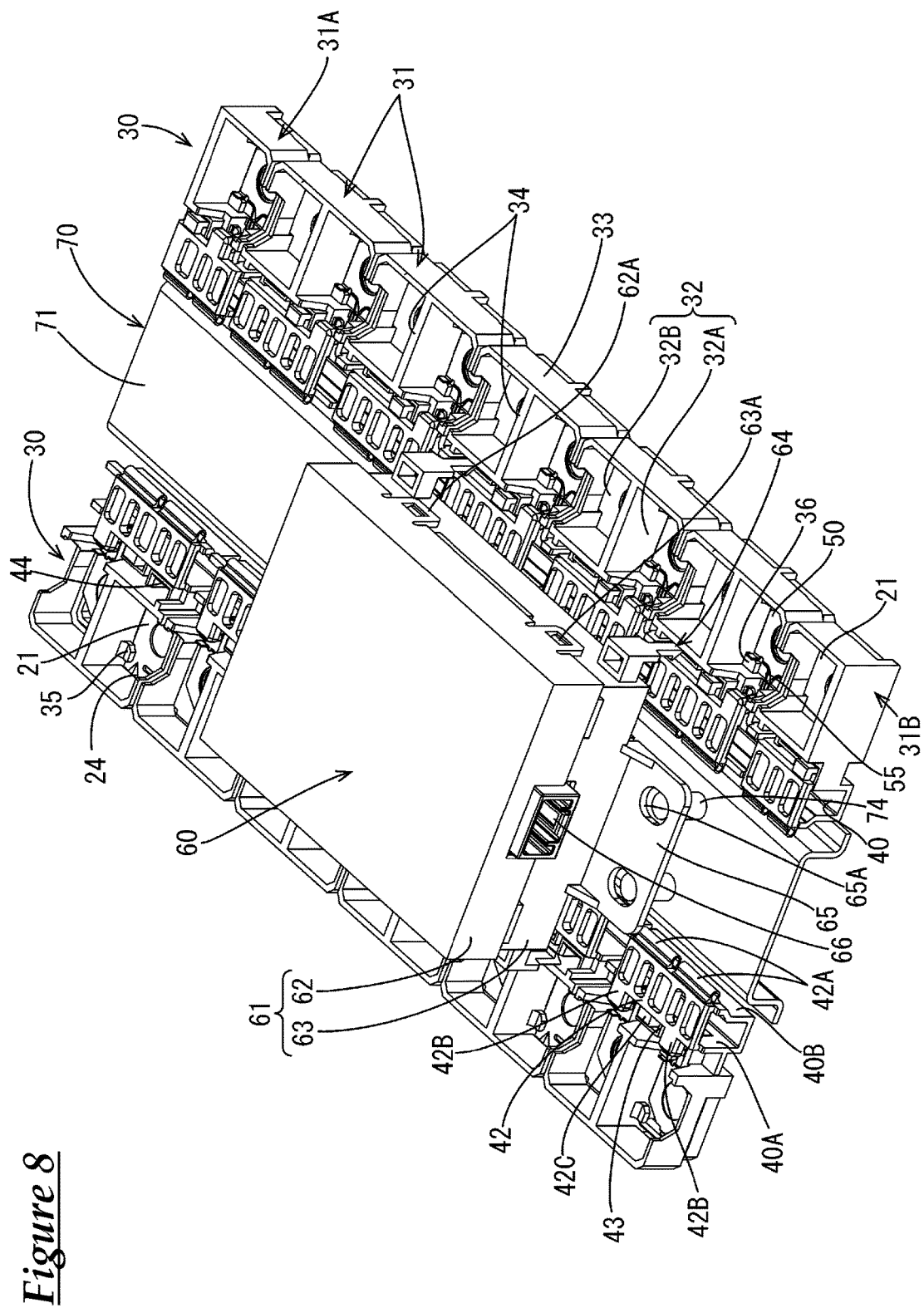
FIG. 8 is a perspective view of the wiring module during attachment work.
Figure 9:
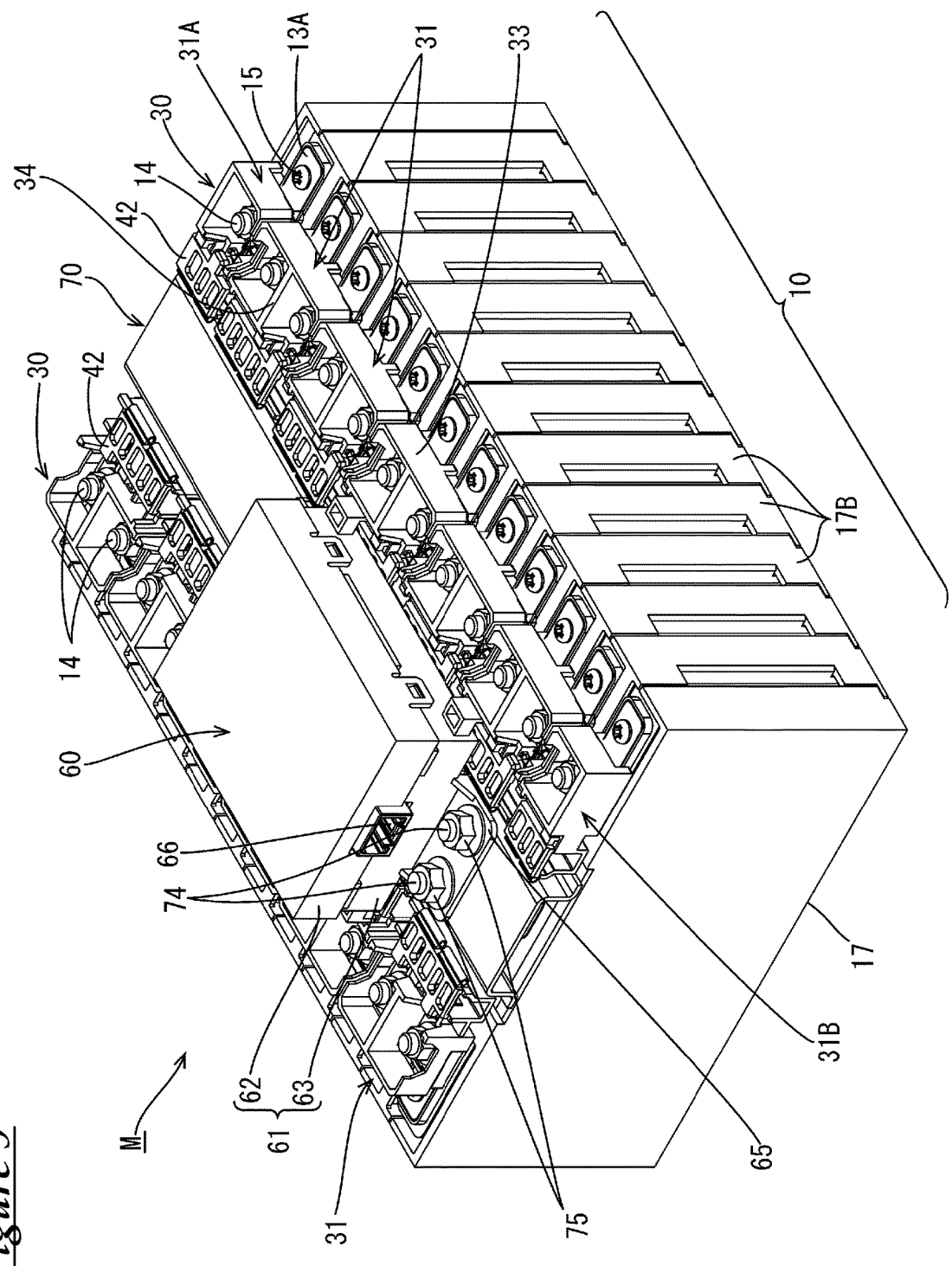
FIG. 9 is a perspective view of the battery module.
Figure 10:
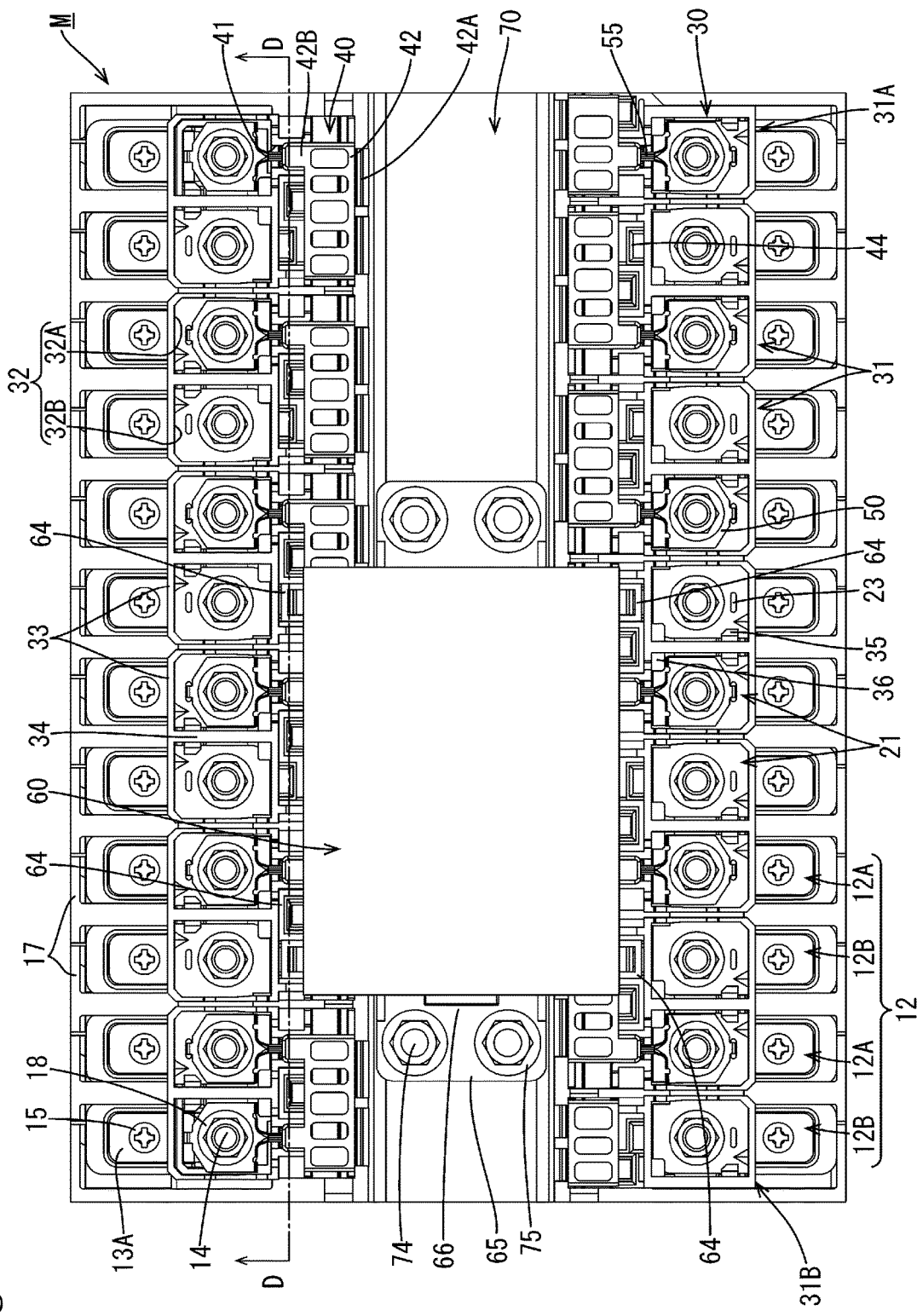
FIG. 10 is a plan view of the battery module.

Next, the duct 70 is attached to the pair of resin protectors 30 and the electronic control unit 60 that have been integrated into one piece. Specifically, as shown in FIG. 8, the duct 70 is, brought closer from below to the resin protectors 30 and the electronic control unit 60 that have been integrated into one piece, and the attaching protrusions 74 are inserted into the attaching holes 65A formed in the attaching sections 65 of the electronic control unit 60. At this stage, the attaching protrusions 74 can be reliably inserted into the attaching holes 65A even if the resin protectors 30 have coupling tolerances in the coupling direction (the X-axis direction) because the attaching holes 65A have an elongated hole shape extending along the coupling direction of the coupling units 31 (the X-axis direction). Then, the nuts 75 are fastened from above. And with this, the battery wiring module 20 is complete (see FIG. 2).

The battery wiring module 20 according to the present embodiment thus assembled is attached to the upper surface side of the electric cell set 10 arranged such that the electrodes 12 face upward. In other words, as shown in FIG. 1, the battery wiring module 20 is mounted on the upper surface 10A of the electric cell set 10, and the electrode posts 14 of the electrodes 12 are inserted into the terminal through holes 22 of the bus bars 21 (and the terminal insertion holes 52 of the voltage detection terminals 50). Then, the nuts 18 are screwed onto the electrode posts 14 so that adjacent positive and negative electrodes 12 are connected, and thus the battery module M is complete (see FIG. 9 and FIG. 10).

The following describes the actions and the potential advantageous effects of the present embodiment.

According to the present embodiment, even if the electronic control unit 60 is attached to a resin protector 30 that is configured to be expandable (i.e. able to accommodate tolerances) in the coupling direction of the coupling units 31 (the X-axis direction), i.e. the direction in which the electric cells 11 are arranged, the electronic control unit 60 is configured to be able to move within a range corresponding to the above-described clearances C in the direction in which the electric cells 11 are arranged, relative to the resin protectors 30. Therefore, the resin protectors 30 can be attached to the electric cell set 10, remaining in the state of being able to accommodate the tolerances, without being restricted by the electronic control unit 60 from expanding.

Also, while the electronic control unit 60 is attached to the resin protectors 30 so as to be movable relative to the resin protectors 30, the electronic control unit 60 is fixed to the duct 70. Therefore, the entirety of the battery wiring module 20 can be handled in a stable state.

Second Embodiment

Figure 12:
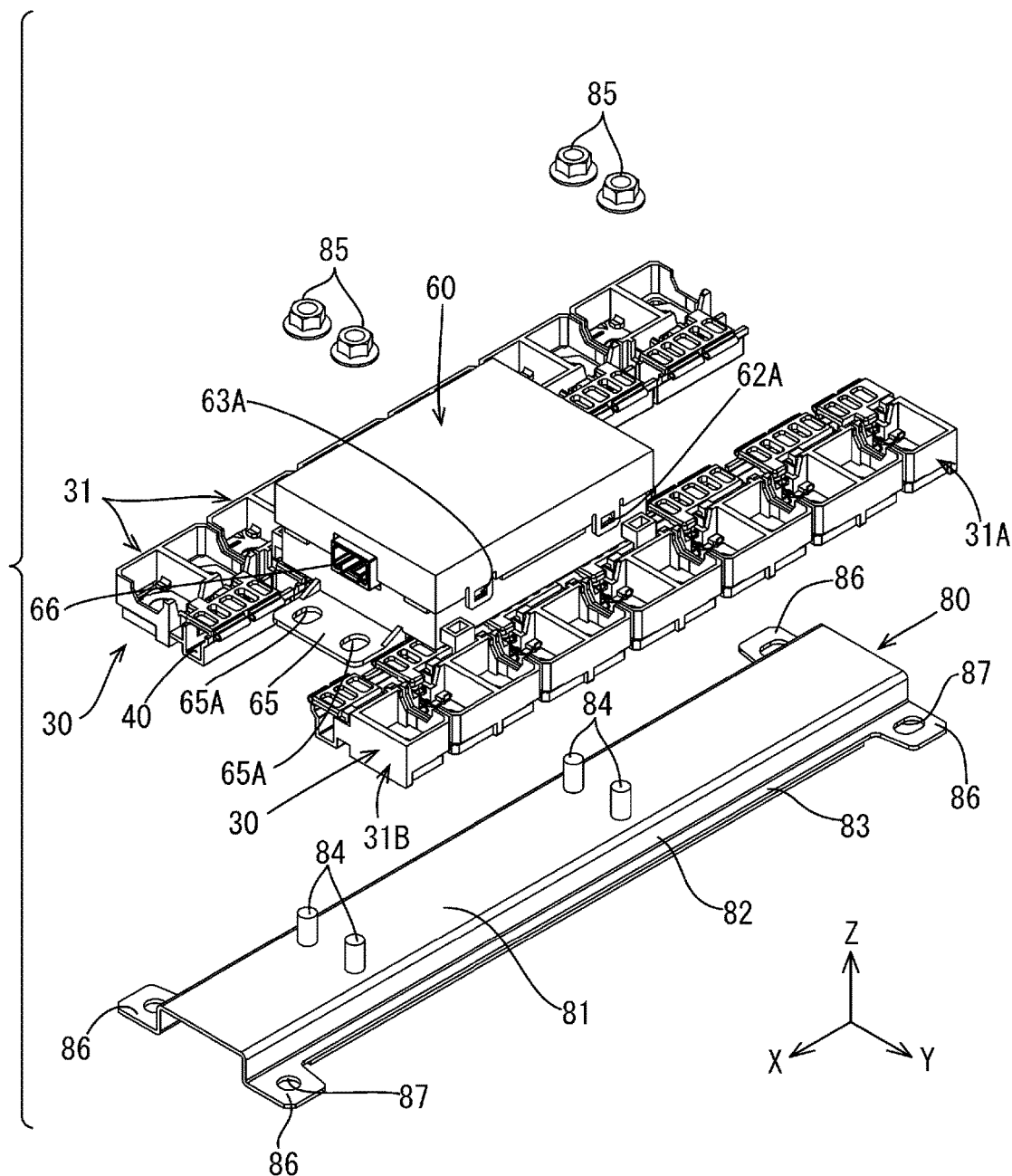
FIG. 12 is an exploded perspective view of a wiring module according to a second embodiment.
Figure 13:
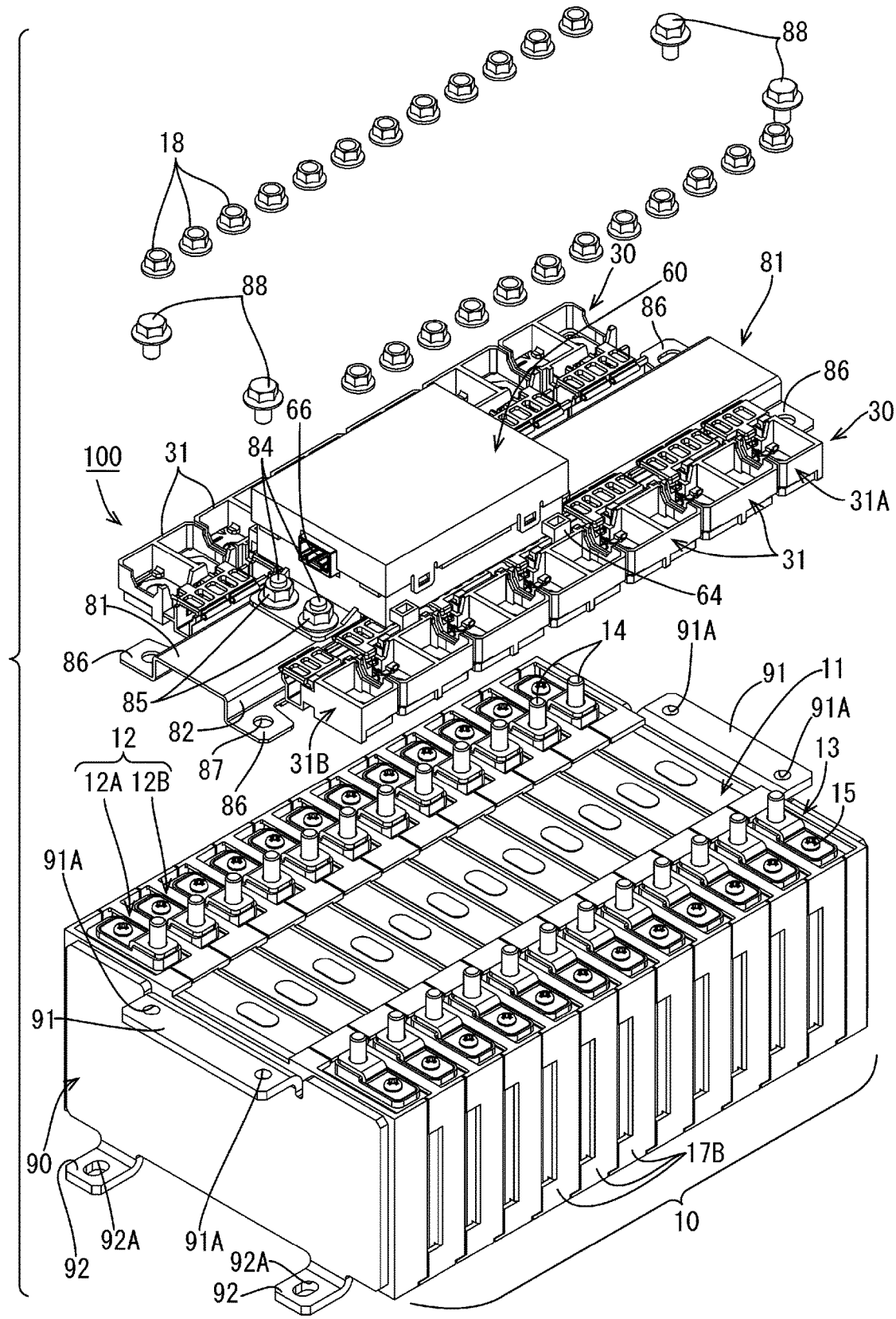
FIG. 13 is an exploded perspective view of a battery module.
Figure 14:
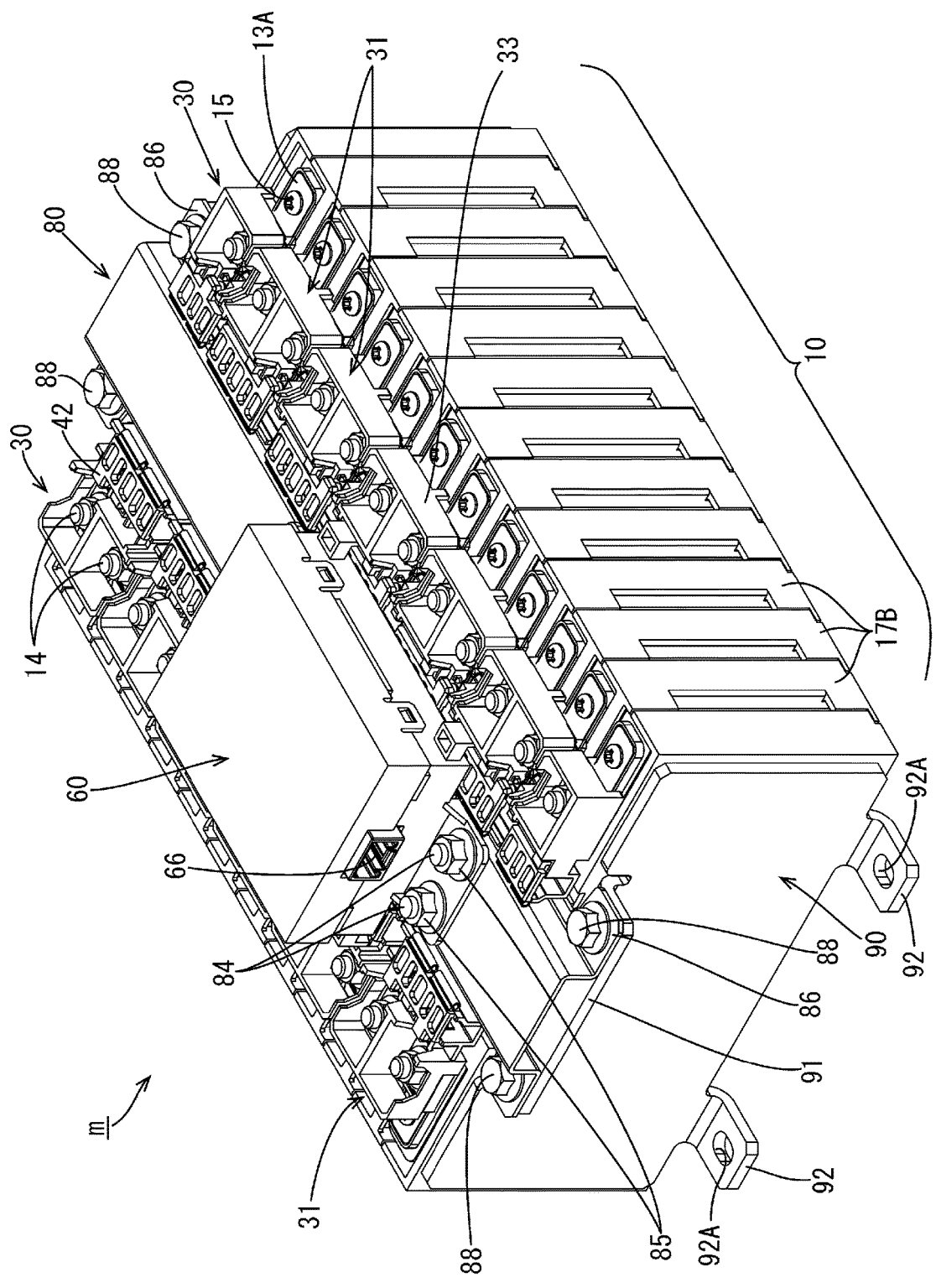
FIG. 14 is a perspective view of the battery module.

Next, a description is given of a second embodiment with reference to FIG. 12 to FIG. 14. Note that the following only describes structures that are different from those in the first embodiment. The structures that are the same those as in the first embodiment are given the same reference signs, and their duplicate description is omitted.

In the present embodiment, a duct 80 has a configuration that is different from the configuration in the above-described first embodiment. As shown in FIG. 12, the duct 80 has: a top panel section 81 having an elongated plate shape; a pair of side wall sections 82 that respectively extend downward from both side edge portions of the top panel section 81 along the front-rear direction (the X-axis direction); and contacting sections 83 that extend outward from the lower edge portions of the pair of side wall sections 82 in parallel with the top panel section 81, and the duct 80 also has pairs of attaching sections 86 that are formed to bulge and extend in the left-right direction (the Y-axis direction) from the end portions, in the front-rear direction, of each of the two side edge portions of the contacting sections 83. Each attaching section 86 is provided with an attaching hole 87 that penetrates through the plate surface. Also, two pairs of round rod-shaped attaching protrusions 84 are formed on the upper surface of the top panel section 81, protruding upward.

The length of the top panel section 81 in the front-rear direction is designed to be longer than the length of the electric cell set 10 in the front-rear direction so that, as shown in FIG. 14, the attaching sections 86 protrude from the electric cell set 10 in the front-rear direction when a battery wiring module 100 (the duct 80) is installed onto the upper surface 10A of the electric cell set 10.

Also, as shown in FIG. 13, attaching plates 90 each having a plate shape are fixed to the end surfaces of the electric cell set 10 in the front-rear direction and integrated with the separators 17. A pair of first fixing sections 91 that extend along the front-rear direction are provided on the upper edges of the attaching plates 90, orthogonal to the plate surfaces and parallel to the upper surface 10A of the electric cell set 10, and a pair of first fixing holes 91A are formed in each of the first fixing sections 91. The hole wall of each first fixing hole 91A is provided with a thread, which is not shown in the drawings.

Furthermore, two pairs of second fixing sections 92 that extend along the front-rear direction are provided on the lower edges of the attaching plates 90, orthogonal to the plate surfaces and parallel to the bottom surface of the electric cell set 10, and a second fixing hole 92A is formed in each of the second fixing sections.

When the duct 80 having the above-described configuration is attached to the pair of resin protectors 30 and the electronic control unit 60 that have been integrated into one piece, the attaching protrusions 84 of the duct 80 are inserted into the attaching holes 65A formed in the attaching sections 65 of the electronic control unit 60, and nuts 85 are fastened (see FIG. 13), in the same manner as in the first embodiment. Consequently, the battery wiring module 100, in which the resin protectors 30, the electronic control unit 60 and the duct 80 are integrated, is complete.

The battery wiring module 100 according to the present embodiment thus assembled is mounted on the upper surface 10A of the electric cell set 10, and the electrode posts 14 of the electrodes 12 are inserted into the terminal through holes 22 of the bus bars 21 (and the terminal insertion holes 52 of the voltage detection terminals 50). Then, the nuts 18 are screwed onto the electrode posts 14 so that adjacent positive and negative electrodes 12 are connected.

Furthermore, bolts 88 are screwed into the attaching holes 87 of the attaching sections 86 and the first fixing holes 91A of the first fixing sections 91, which are aligned with each other, and thus the battery wiring module 100 and the electric cell set 10 are more firmly fixed to each other. Thus, the battery module m is complete (see FIG. 14).

In the battery wiring module 100 according to the present embodiment, the duct 80 is attached to the electric cell set 10. Therefore, in addition to the advantageous effects of the first embodiment, there is a potential advantageous effect that the battery wiring module 100 can be more stably attached to the electric cell set 10.

Third Embodiment

Next, a description is given of a third embodiment with reference to FIG. 15 to FIG. 25. Note that the following only describes structures that are different from those in the first embodiment. The structures that are the same as those in the first embodiment are given the same reference signs, and their duplicate description is omitted.

Figure 15:
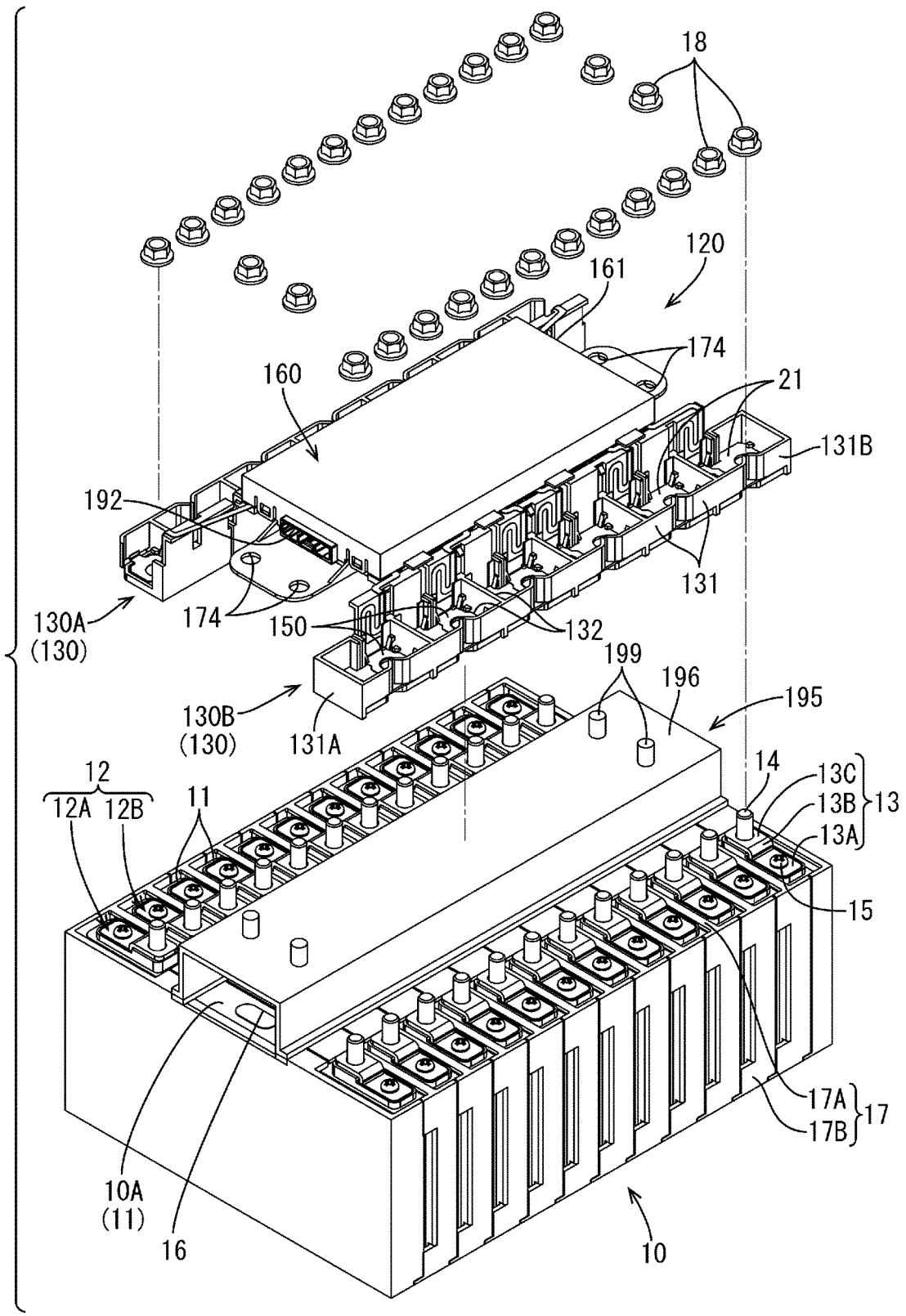
FIG. 15 is an exploded perspective view of a battery module according to a third embodiment.
Figure 23:
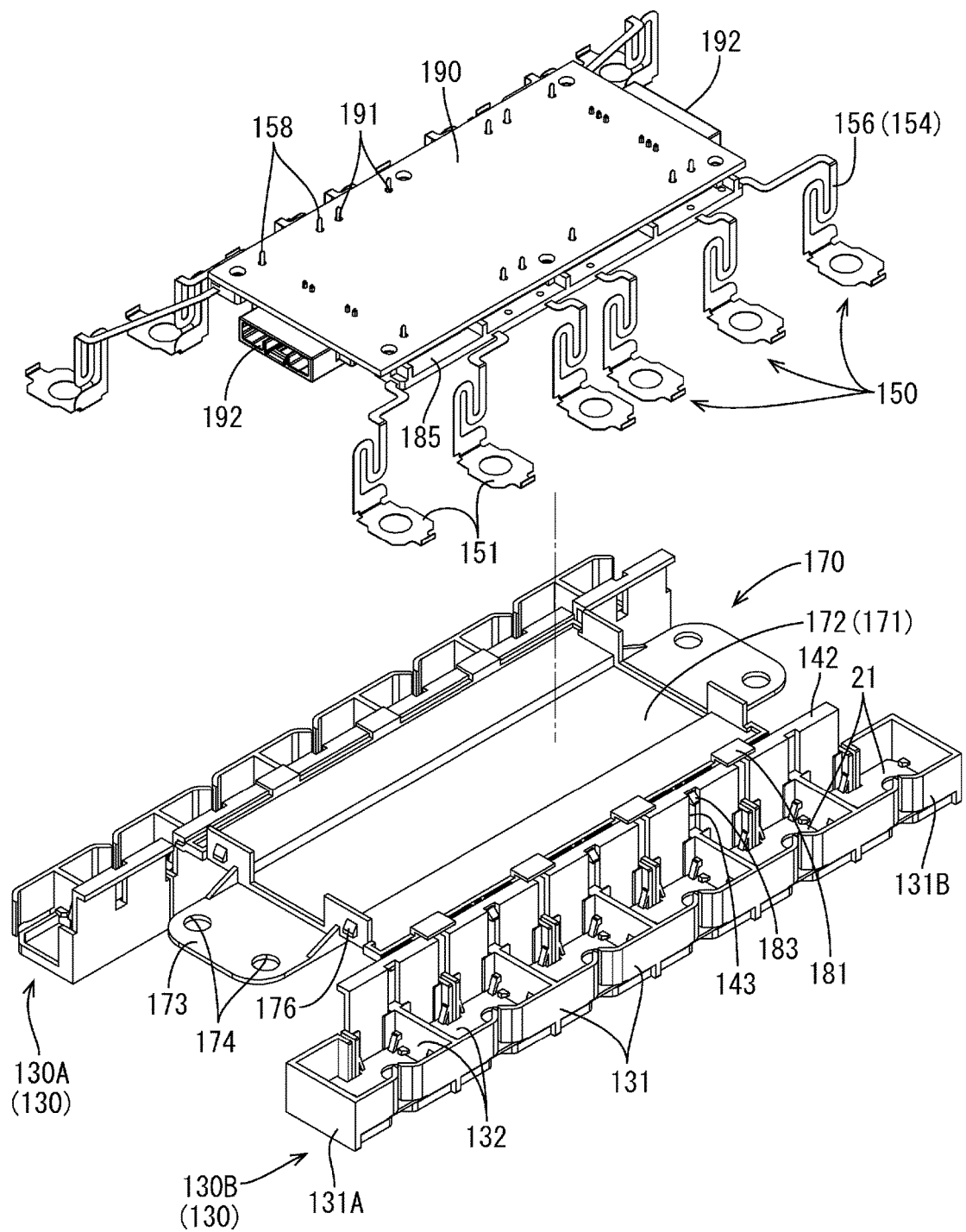
FIG. 23 is a perspective view showing a process in which the voltage detection bus bars are housed in the resin protectors.

In a battery wiring module 120 according to the present embodiment is, as shown in FIG. 15 and FIG. 23, voltage detection bus bars 150 (an example of detection members) are each provided integrally with a connection piece 154 for connecting to an electronic control unit 160. Each connection piece 154 has a tolerance accommodating section 156.

The bus bars 21 are different from those in the above-described embodiment only in that the slits 23 are not provided, and in other aspects, the bus bars 21 have configurations that are the same as those in the first embodiment.

Resin protectors 130 are formed by coupling a plurality of coupling units 131 to one another other by using the bus bars 21, and have a shape that is elongate in the direction along which the plurality of electric cells 11 are arranged (the X-axis direction). Also, a pair of resin protectors 130A and 130B are coupled to each other by a lower case 170 of an electronic control unit 160 described below (see FIG. 17 and FIG. 23).

Figure 16:
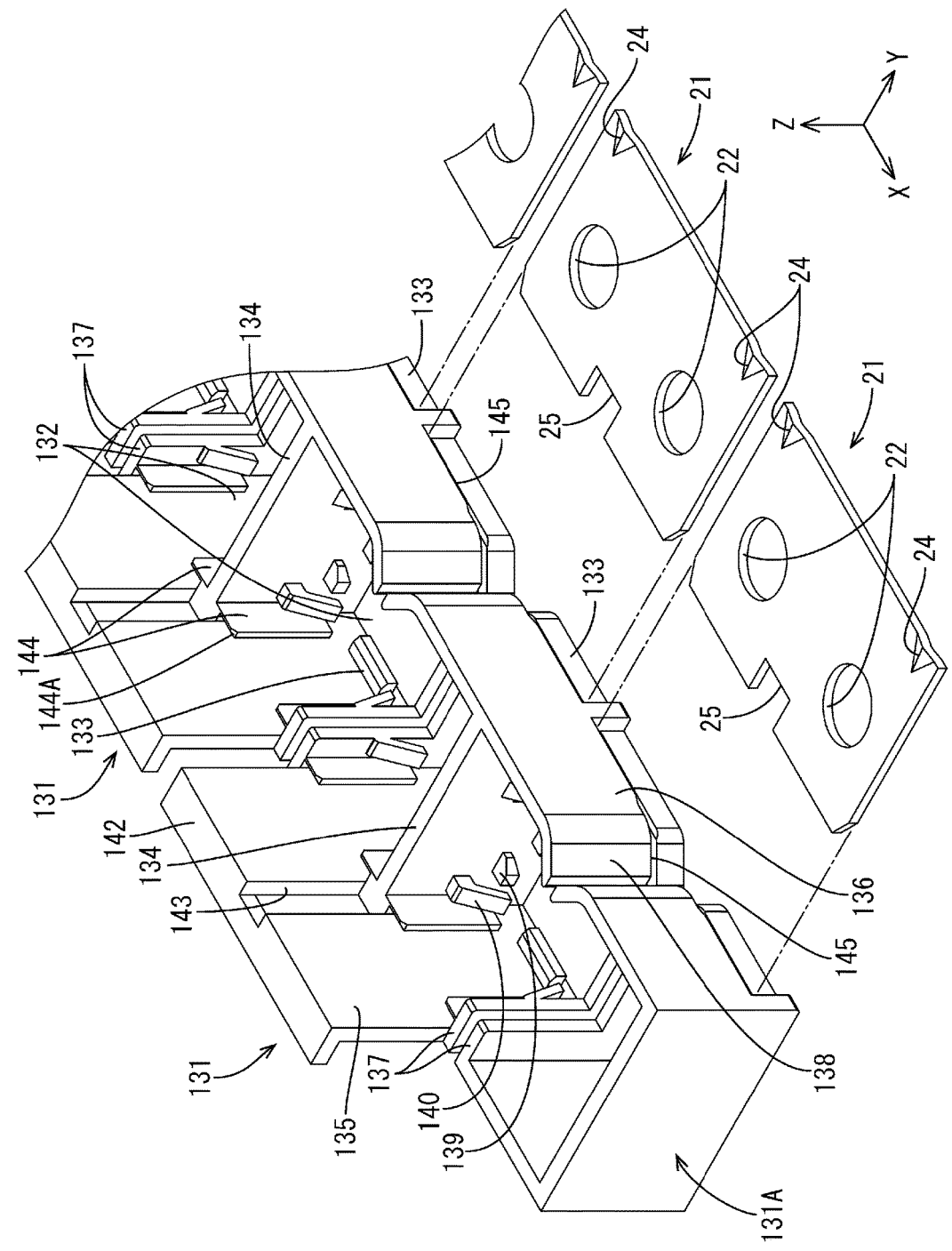
FIG. 16 is a partially-enlarged perspective view showing a process in which bus bars are inserted into coupling units.
Figure 19:
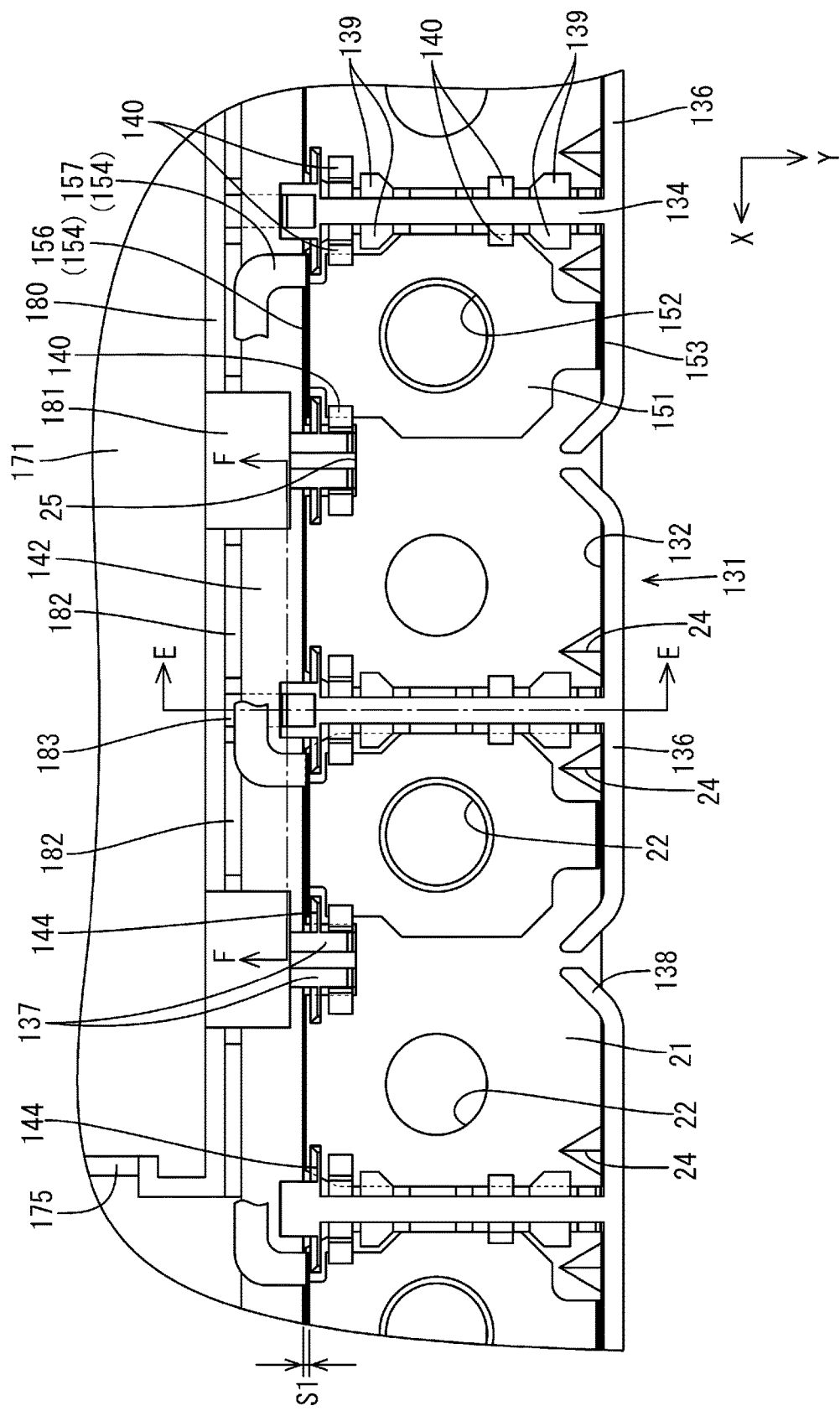
FIG. 19 is a partially-enlarged plan view of the battery wiring module.
Figure 20:
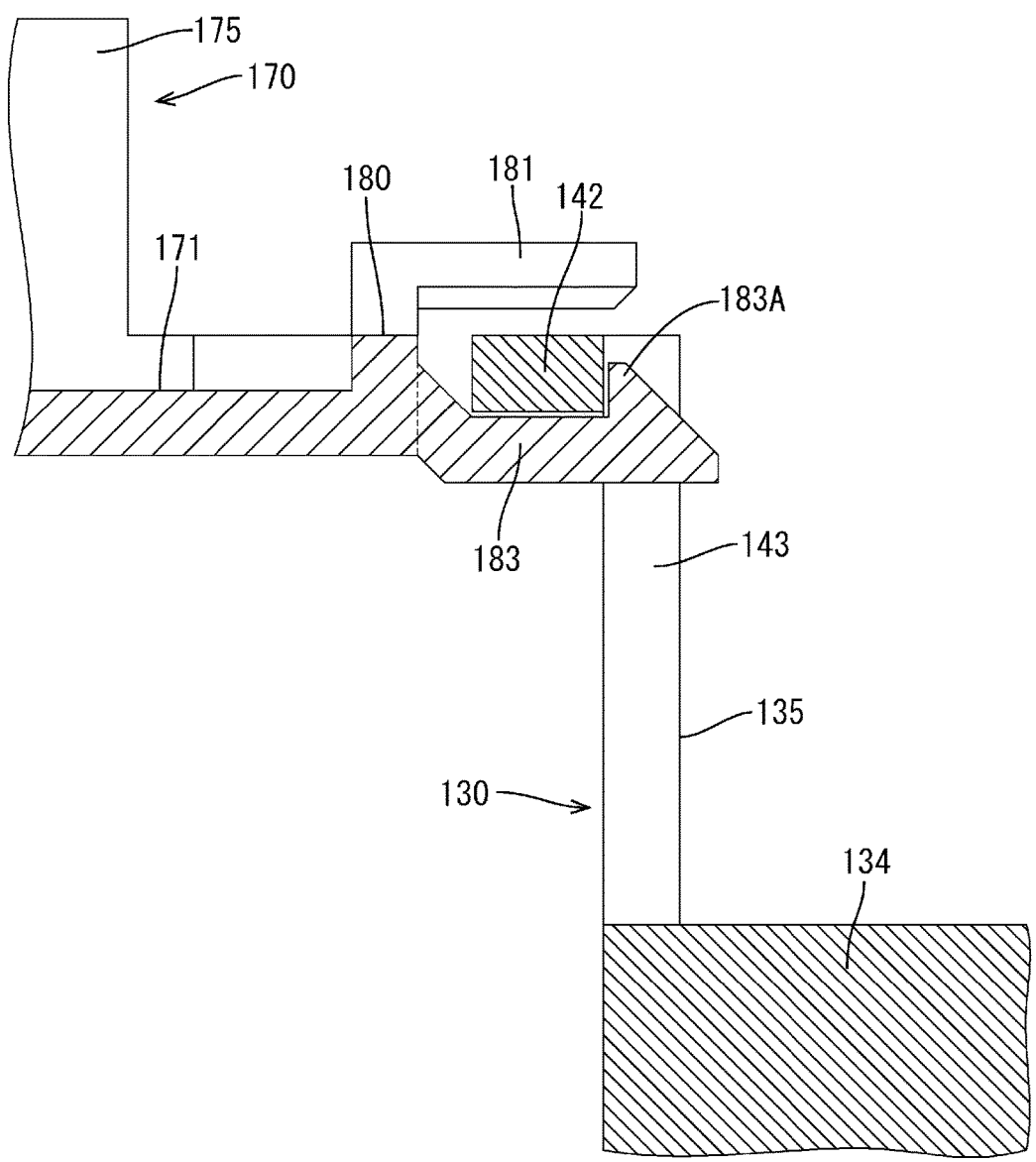
FIG. 20 is a cross-sectional view along a line E-E shown in FIG. 19.

The coupling units 131 are, as shown in FIG. 16 and FIG. 19, each provided with a pair of bus bar holding sections 132 that house and hold a bus bar 21. Each bus bar holding section 132 has a size for housing approximately half a bus bar 21. Each bus bar holding section 132 houses only a bus bar 21, or a voltage detection bus bar 150 described below as well as a bus bar 21. Note that end portion coupling units 131A and 131B, each having only one bus bar holding section 132, are arranged at the end portions, in the front-rear direction (the X-axis direction), of a second resin protector 130B on the front-right side in FIG. 17.

The coupling units 131 are each provided with: an inner side wall 135 that is on the back side in FIG. 16; an outer side wall 136 that is on the front side in FIG. 16; and an insulation wall 134, which are arranged approximately in an H-shape. The insulation wall 134 couples the inner side wall 135 and the outer side wall 136 at their respective central portions. Also, a bottom section of each coupling unit 131 is provided with a mounting section 133 on which the peripheral portion of a bus bar 21 can be placed. Each bus bar holding unit 132 is configured to be open in the bottom-top direction (the Z-axis direction) and toward one side (in the X-axis direction).

More specifically, the two edge portions of the inner side wall 135 are each provided with a locking wall 137 that extends toward the outer side wall 136 in parallel with the insulation wall 134. The width of the locking walls 137 in the Y-axis direction is approximately ⅕ of the width of the insulation walls 134 in the Y-axis direction, and the locking walls 137 are each able to be locked within a recess 125 of the bus bar 21 inserted into the bus bar holding unit 132. Also, the two edge portions of the outer side wall 136 are each provided with a diagonal wall 138 that extends diagonally toward the inner side wall 135, and thus the corner portions of the coupling unit 131 on the outer side wall 136 side each have a bevelled shape. The pair of bus bar holding units 132 are each an area surrounded by the locking wall 137, the inner side wall 135, the insulation wall 134, the outer side wall 136, and the diagonal wall 138.

Out of these walls, the upper surfaces of the locking wall 137, the insulation wall 134, the outer side wall 136, and the diagonal wall 138 are all flush. In contrast, the upper surface of the inner side wall 135 is designed to be higher than the aforementioned walls. Note that all of these walls are designed to be higher than the upper end portions of the electrode posts 14 of the electrodes 12 when the battery wiring module 120 has been attached to the electric cell set 10, and have the function of protecting the electrode posts 14.

Figure 18:
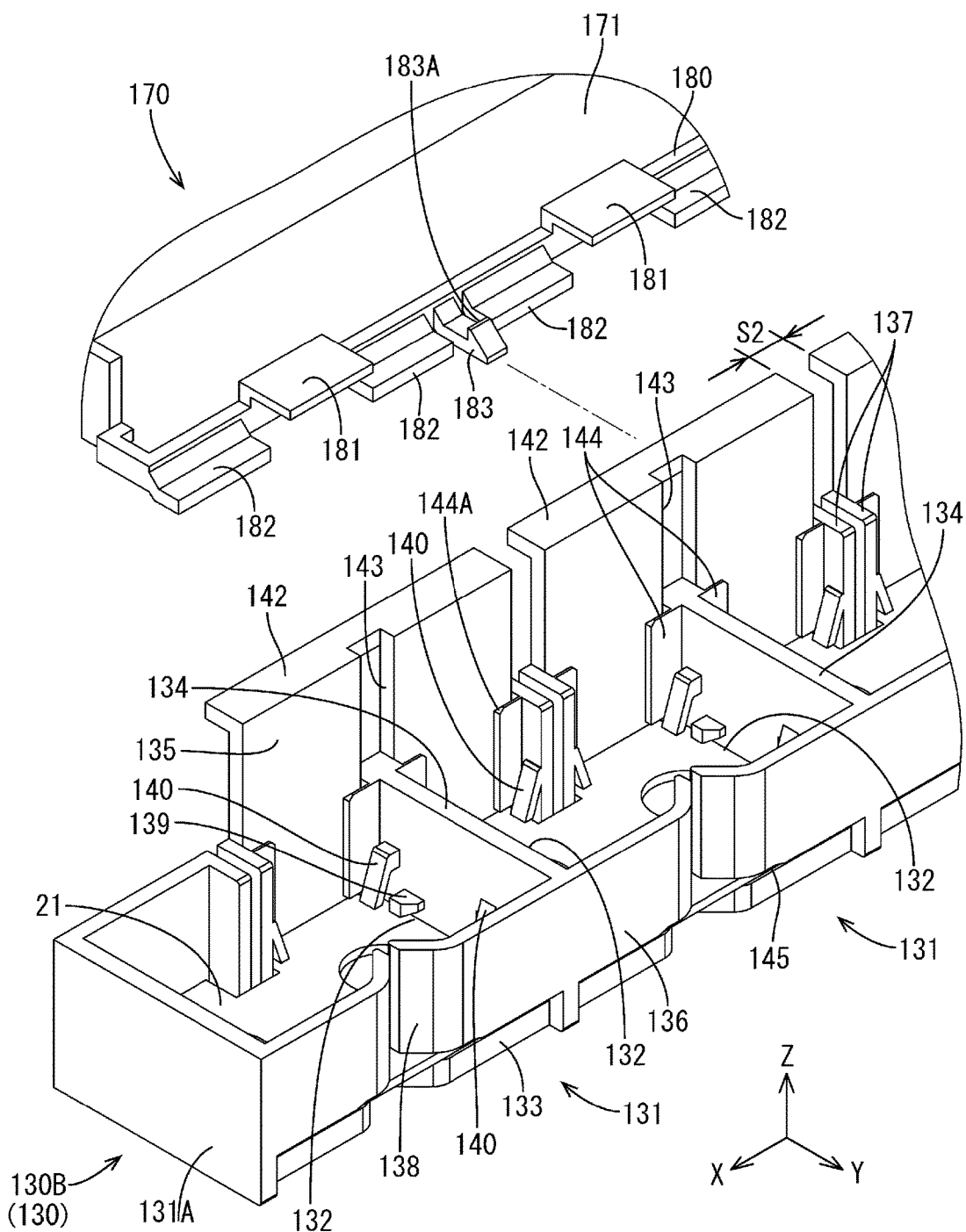
FIG. 18 is a partially-enlarged perspective view of FIG. 17.

As shown in FIG. 18 and FIG. 19, two holding protrusions 139 are formed on each insulation wall 134, protruding toward the inside of the corresponding bus bar holding unit 132. The holding protrusions 139 are located above the bus bar 21 housed within the bus bar holding unit 132 and have the function of holding the bus bar 21 together with the mounting section 133.

Also, three holding pieces 140 are provided on the insulation wall 134 and the locking wall 137. The holding pieces 140 are located above the voltage detection bus bar 150 housed within a bus bar holding unit 132, and have the function of holding the voltage detection bus bar 150 together with the bus bar 21. Two holding pieces 140 are formed on each insulation wall 134, and one holding piece 140 is formed on each locking wall 137, so as to extend obliquely downward, toward the inside of the corresponding bus bar holding unit 132.

As shown in FIG. 16, bus bar insertion ports 145 are formed between the outer side walls 136 and the bottom sections (the mounting sections 133). In the present embodiment, the bus bar insertion ports 145 are configured to allow the bus bars 21 to be inserted from the outer side wall 136 side of the bus bar holding units 132 toward the inner side wall 135 side.

As described above, the inner side walls 135 are designed to have upper surfaces that are higher than those of the other wall sections, that is to say, they are designed to be higher in the height dimension. As shown in FIG. 18, the upper end of each inner side wall 135 is bent in an L-shape, extending in the direction away from the bus bar holding unit 132, and is configured as an interposed section 142 to be interposed between a pressing piece 181 and a receiving piece 182 of the lower case 170 described below. Also, a portion of each inner side wall 135 above an intersection with an insulation wall 134 is provided with a slit 143 having a width that is larger than the wall thickness of the insulation wall 134 and extending in the bottom-top direction (the Z-axis direction).

Each slit 143 is provided to reach the upper end of the inner side wall 135, and cuts out a portion of the interposed section 142.

Furthermore, each bus bar holding unit 132 is provided with a pair of support walls 144 that extend along the tolerance accommodating section 156 of the connection piece 154 of the voltage detection bus bar 150 described below housed within the bus bar holding unit 132. Each pair of support walls 144 is provided on the inner wall surfaces of an insulation wall 134 and a locking wall 137 and extends in the vertical direction, that is to say in the direction along the inner side walls 135. Gap S1 between the support walls 144 and the inner side walls 135 are designed to be slightly larger than the thickness of the connection pieces 154 of the voltage detection bus bars 150. The tolerance accommodating sections 156 of the connection pieces 154 are housed within the gaps S1, and are thus stably held while extending along the inner side walls 135, so that the tolerance accommodating sections 156 are prevented from tilting toward the bus bar holding units 132 (see FIG. 19). Also, the distance between the pair of support walls 144 arranged side by side in each bus bar holding unit 132 is designed to have a length for accommodating the boundary portion between the main portion 151 and the connection piece 154 of the voltage detection bus bar 150.

Note that the upper surfaces of the support walls 144 are flush with the upper surfaces of the insulation walls 134 and the locking walls 137. Also, the upper end corner portions of the opposing end surfaces of each pair of support walls 144 are cut out in an obliquely downward direction toward the inner side wall 135 side, and are configured to serve as guide surfaces 144A for guiding the connection piece 154 of the voltage detection bus bar 150 described below into the gap S1.

As shown in FIG. 18 and FIG. 19, each bus bar holding unit 132 of the coupling units 131 described above holds approximately half a bus bar 21. Among the plurality of coupling units 131, one coupling unit 131 and its adjacent coupling unit 131 are coupled to each other via a single bus bar 21. Bus bars 21 that are adjacent to each other are separated and insulated from each other by an insulation wall 134.

In the situation where the bus bars 21 are held by the bus bar holding units 132, the locking walls 137 serve as locking sections that are interlocked with the recesses 25 of the bus bars 21. A clearance is formed between a locking wall 137 and the recess 25 of a bus bar 21, in the coupling direction of the coupling units 131 (the X-axis direction; see FIG. 19), and therefore adjacent coupling units 131 are movable in the coupling direction (the X-axis direction) relative to the bus bar 21. In other words, the manufacturing tolerances and the assembly tolerances provided between the plurality of electrodes 12 in the direction in which the plurality of electric cells 11 are arranged (the X-axis direction) can be accommodated.

Figure 17:
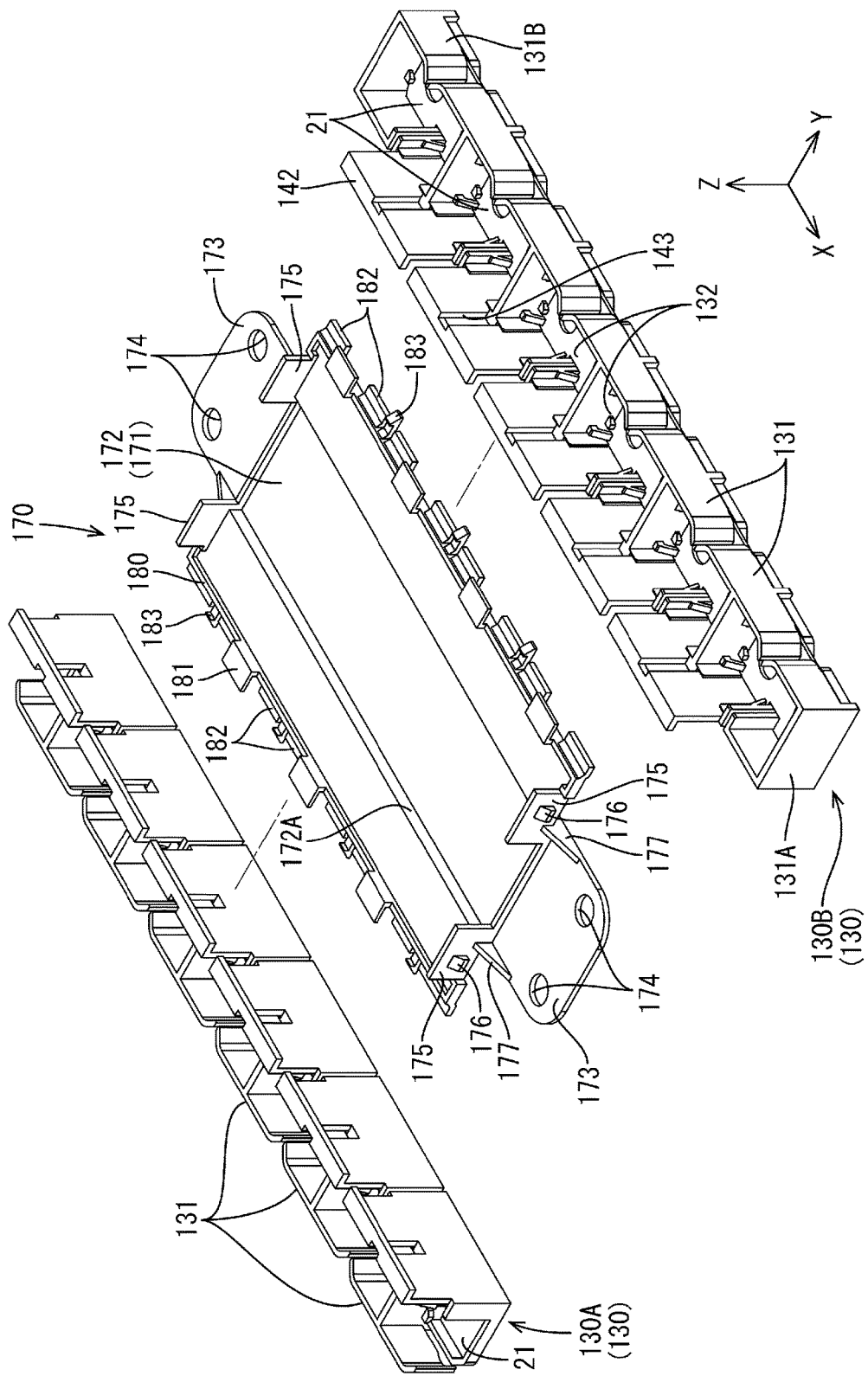
FIG. 17 is a perspective view showing a process in which resin protectors and a lower case are attached to each other.

The first resin protector 130A arranged on the back-left side in FIG. 17 is configured by coupling a plurality of (six) coupling units 131 to one another in a row in the X-axis direction, using bus bars 21. In contrast, the second resin protector 130B arranged on the front-right side in FIG. 17 is configured by coupling a given number of (five) coupling units 131, the given number being smaller by one than the number of coupling units 131 of the first resin protector 130A. Also, the end portion coupling units 131A and 131B are coupled to the end portions thereof in the X-axis direction, and the second resin protector 130B is configured such that the coupling units 131 thereof are displaced from those of the first resin protector 130A by the width of a single electric cell 11.

Voltage detection bus bars 150 for detecting the voltage across an electric cell 11 are arranged within predetermined bus bar holding units 132 of the resin protectors 130 (the coupling units 131). The voltage detection bus bar 150 are formed by punch-processing a metal plate material made of copper, a copper alloy, stainless steel (SUS), aluminium, or the like such that the metal plate material has a predetermined shape, and press-processing as well. The surfaces of the voltage detection bus bars 150 may be plated with metal such as tin or nickel.

Figure 22:
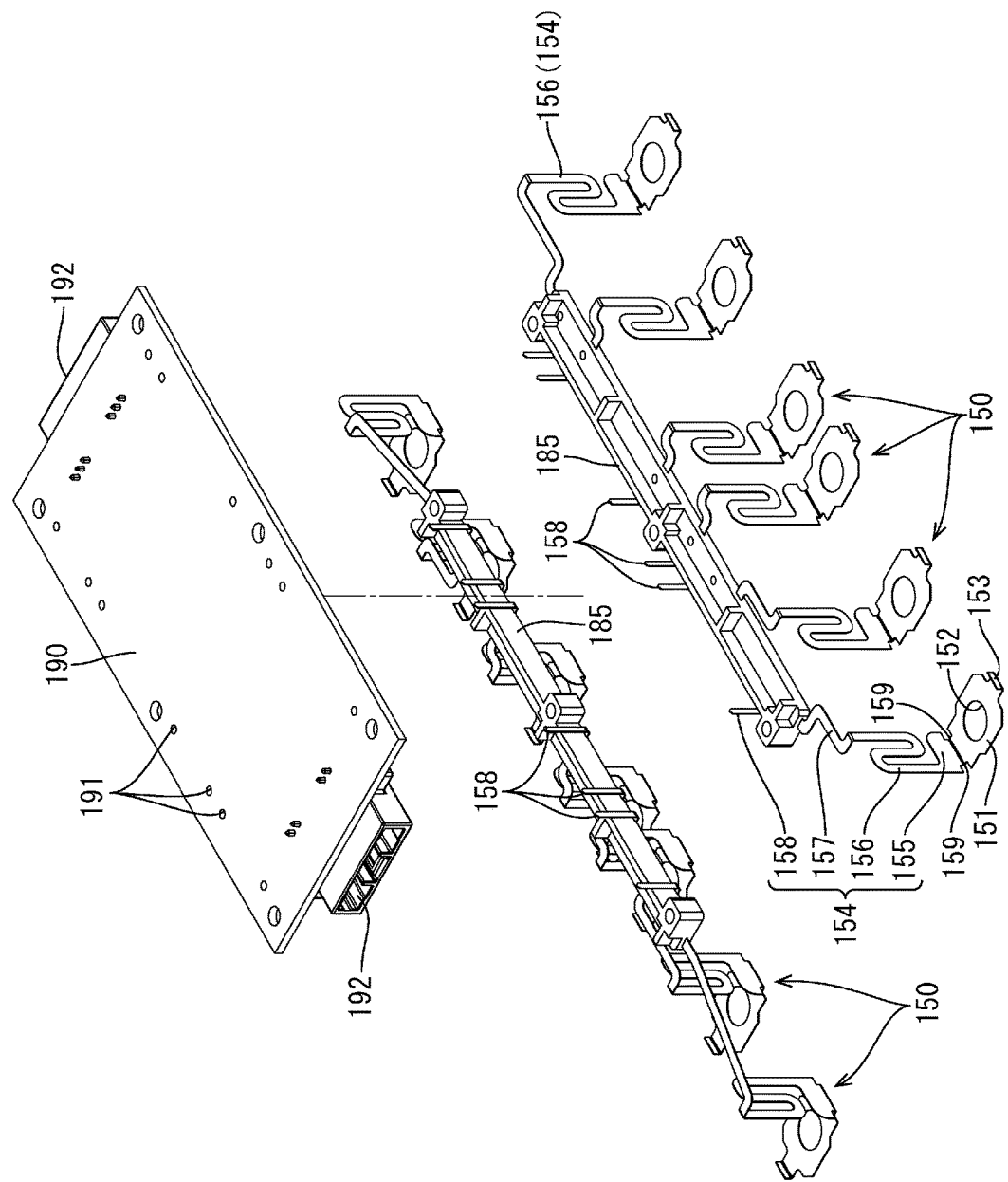
FIG. 22 is a perspective view showing a process in which voltage detection bus bars that have been integrated with positioning members are attached to a detection circuit substrate.

In the present embodiment, as shown in FIG. 22, each voltage detection bus bar 150 is provided integrally with: a main portion 151 that has an approximately octagonal shape with a size that is approximately half a bus bar 21, and that is placed on a bus bar 21; and a connection piece 154 that is connected to a detection circuit substrate 190 described below.

A terminal insertion hole 152, into which an electrode post 14 can be inserted, is formed near the center of the main portion 151, overlapping the terminal through hole 22 of the bus bar 21. The diameter of the terminal insertion holes 152 is designed to be slightly larger than the diameter of the electrode posts 14, and to be slightly larger than the diameter of the terminal through holes 22 of the bus bars 21 as well. Also, a press-contact piece 153 extends from one edge portion of the main portion 151. The press-contact piece 153 comes into press-contact with the inner surface of the outer side wall 136 of a bus bar holding unit 132 in order to stably hold the main portion 151 within the bus bar holding unit 132. The press-contact piece 153 extends from the main portion 151 over a width that is smaller than the width of the one edge portion of the main portion 151, and is formed by bending the tip upward into an L-shape.

Also, the connection piece 154 that is connected to the detection circuit substrate 190 described below extends from the end of the main portion 151 that is opposite end to the press-contact piece 153 of the main portion 151. Each connection piece 154 has: a base end section 155 that stands on the main portion 151 in the vertical direction; a tolerance accommodating section 156 that extends from a portion of the upper edge of the base end section 155; a lead-out section 157 that is bent in an L-shape at the upper edge of the tolerance accommodating section 156 and extends parallel to the main portion 151; and a connection section 158 that vertically stands on the lead-out section 157 and is connected to the detection circuit substrate 190 described below.

A pair of cut-outs 159 are provided at the ends of the boundary portion between the above-described base end section 155 and main portion 151, so that a pair of support walls 144 described above can pass through.

The tolerance accommodating section 156 is formed by punching so as to have approximately a Z-shape with two curved portions. The tolerance accommodating section 156 is configured to be able to bend and accommodate the tolerance in the direction in which the plurality of electric cells 11 are arranged (the X-axis direction).

The main portion 151 is interposed between a nut 18 and a bus bar 21, and thus the voltage detection bus bar 150 is electrically connected to electrodes 12.

A region, on the connection section 158 side, of the lead-out section 157 of the connection piece 154 is integrated with a positioning member 185 by using insert molding. The positioning member 185 is made of synthetic resin and is used for arranging the plurality of voltage detection bus bars 150 at predetermined positions. The connection sections 158 led out from the positioning members 185 are inserted through predetermined positions of the detection circuit substrate 190 of the electronic control unit 160 described below, and are connected by soldering.

As shown in FIG. 15, the electronic control unit 160 is arranged between the pair of resin protectors 130A and 130B obtained by coupling the above-described coupling units 131 to one another, using the bus bars 21. The electronic control unit 160 is configured with the detection circuit substrate 190 on which a microcomputer, components, and the like are mounted and that is housed in an approximately cuboid case 161 (see FIG. 25). The electronic control unit 160 has a well-known configuration provided with the functions of, for example, monitoring and controlling the electric cells 11 by detecting the voltage, current, temperature, or the like of each electric cell 11.

The case 161 is configured with: an upper case 162 that has the shape of an approximately rectangular box having an opening in the lower surface; and a lower case 170 that has the shape of an approximately rectangular plate.

The lower edges of a pair of side walls 163 of the upper case 162 that extend along the front-rear direction (the X-axis direction) are each provided with a plurality of cut-outs 164 that allow the pressing pieces 181 of the lower case 170 to pass through.

Also, a front wall 165 and a rear wall of the upper case 162 are each provided with an outlet section 166 that lets out a connector section 192 described below. A pair of locking pieces 167 that are interlocked with locking protrusions 176 of the lower case 170 described below are respectively provided on both sides of each outlet section 166.

As shown in FIG. 17, the lower case 170 has a rectangular plate-shaped bottom section 171, and the bottom section 171 is provided with a dent section 172 that is a shallow dent located in a central portion in the left-right direction (the Y-axis direction) and extending along the front-rear direction (X-axis direction). A pair of plate-shaped first fixing sections 173 that have the same width as the dent section 172 in the front-rear direction (X-axis direction) extend in the opposite directions from the edge portions of the bottom section 171 in the front-rear direction, and each first fixing section 173 is provided with a pair of fixing holes 174 that are located side by side.

Also, the edge portions of the bottom section 171 in the front-rear direction are each provided with a pair of second fixing sections 175 that stands on the plate surface of the bottom section 171 in the vertical direction. The second fixing sections 175 are located such that side walls 172A of the dent section 172 are interposed therebetween. A locking protrusion 176 is provided on the outer surface of a portion of each second fixing section 175 located outside the side walls 172A of the dent section 172. The locking pieces 167 provided on the upper case 162 are interlocked with the locking protrusions 176, and thus the upper case 162 and the lower case 170 are attached to each other. Also, a triangular reinforcement wall 177 that is continuous with the outer surface of a second fixing section 175 is provided on both edge portions of each first fixing section 173 and stands on the plate surface of the first fixing section 173.

As shown in FIG. 18, the upper surfaces of a pair of edge portions of the bottom section 171 that extend in the front-rear direction (the X-axis direction) are each provided with a contact rib 180 that extends over the entire range in the front-rear direction, and the plurality of pressing pieces 181 that each stand on the upper surface of each contact rib 180 and extend outward so as to form an L-shape are provided at equal intervals. The pressing pieces 181 are formed at positions that correspond to the gaps S2 between the inner side walls 135 of adjacent coupling units 131 when the lower case 170 and the resin protectors 130 are attached to each other, such that the width of the pressing pieces 181 is larger than the width of the gaps S2.

Also, a pair of side surfaces of the bottom section 171 that extend in the front-rear direction (the X-axis direction) are each provided with a plurality of receiving pieces 182 that extend outward from positions that are slightly lower than the bottom section 171. The receiving pieces 182 are formed at positions that correspond to the interposed sections 142 of the coupling units 131 when the lower case 170 and the resin protectors 130 are attached to each other, such that the width of the receiving pieces 182 is smaller than the width of the interposed sections 142.

As shown in FIG. 18, out of the receiving pieces 182, a receiving piece 182 at a position that corresponds to a slit 143 when the lower case 170 and the resin protectors 130 are attached to each other has been cut out (i.e., no receiving piece 182 is formed), and a locking piece 183 extends from the position from which the receiving piece 182 has been cut out. The locking pieces 183 extend outward from the side edge portions of the bottom section 171 substantially in parallel with the receiving pieces 182 and have a protrusion length that is slightly larger than that of the receiving pieces 182. A locking protrusion 183A that protrudes upward is formed on the upper surface of the tip portion of each locking piece 183. The locking protrusions 183A are interlocked with the upper edge portions of the slits 143 of the above-described resin protectors 130 (the coupling units 131), and thus the lower case 170 and the resin protectors 130 are attached to each other and integrated into one piece (see FIG. 20).

Figure 21:
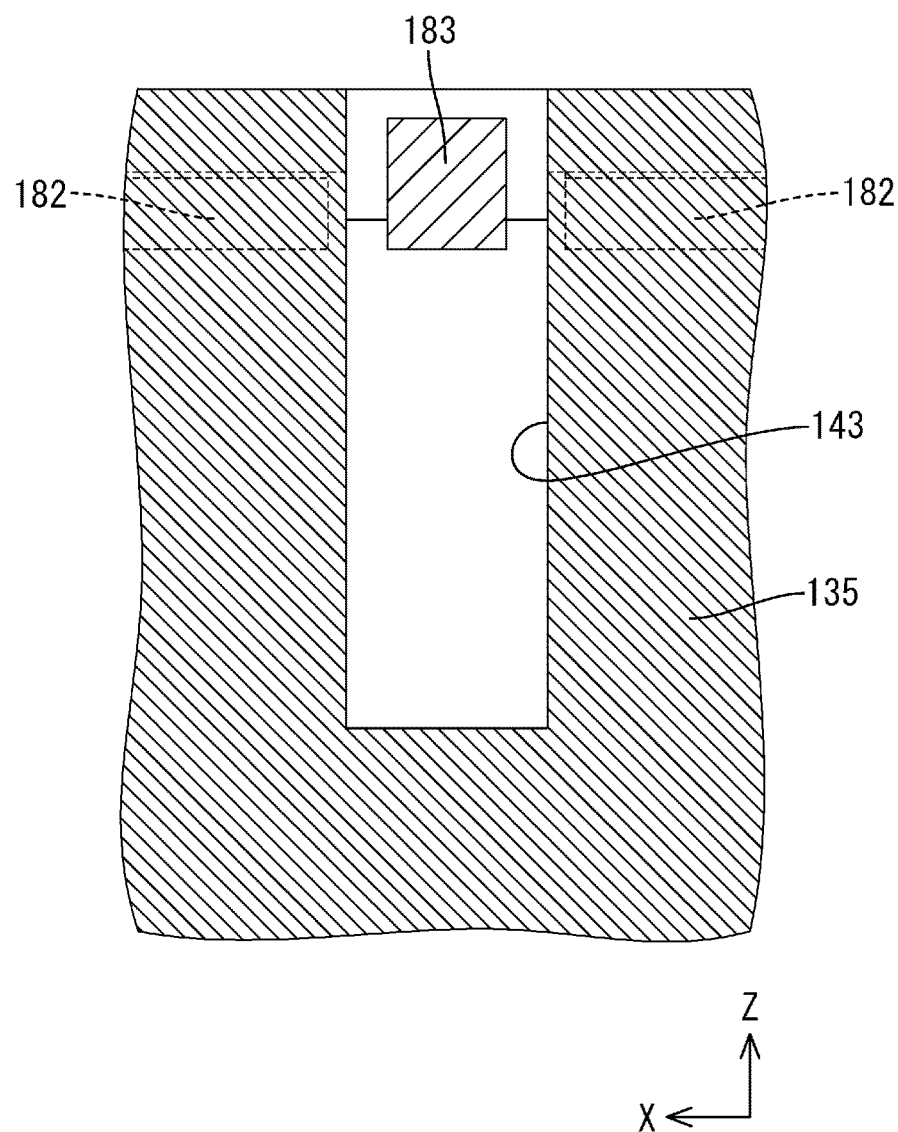
FIG. 21 is a cross-sectional view along a line F-F shown in FIG. 19.

Note that the width of the locking pieces 183 is designed to be smaller than the width of the slits 143, and thus the locking pieces 183 and the slits 143 are configured to be interlocked with each other while having clearances in the direction in which the electric cells 11 are arranged (the X-axis direction; see FIG. 21). In other words, the lower case 170 and the resin protectors 130 are configured to be movable in the X-axis direction relative to each other, and to accommodate the tolerances.

Also, the pressing pieces 181 and the receiving pieces 182 are displaced from each other without overlapping each other in the bottom-top direction.

The detection circuit substrate 190 is provided with a conductive circuit, which is not shown in the drawings and is formed on the surface thereof by using print wiring technology, and a plurality of through holes 191 are provided at appropriate positions on the surface (see FIG. 22). Some of the through holes 191 are holes that allow the connection sections 158 of the voltage detection bus bars 150 to penetrate therethrough, and the connection sections 158 that penetrate through the through holes 191 are connected to the conductive circuit by using a well-known method such as soldering. Also, the connector sections 192 for connecting the conductive circuit of the detection circuit substrate 190 to a counterpart connector (not shown in the drawings) are integrally provided on the back surface of the detection circuit substrate 190 and are open in the front-rear direction.

As shown in FIG. 15, a duct 195 has the same shape as the duct 70 according to the first embodiment above, and two pairs of round rod-shaped attaching protrusions 199 are formed on the upper surface of a top panel section 196, protruding upward. A thread (not shown in the drawings) is formed on the outer circumferential surface of each attaching protrusion 199, and the electronic control unit 160 and the duct 195 are integrated into one piece with nuts 18 screwed onto the threads.

Next, a description is given of a method for assembling the battery wiring module 120 according to the present embodiment.

First, a predetermined number of coupling units 131 are prepared, and then the bus bars 21 are inserted into the bus bar holding sections 132 from the bus bar insertion holes 145 so that the plurality of coupling units 131 are brought into a coupled state (see FIG. 16). End portions of the bus bars 21 are locked by the holding protrusions 139 and the holding pieces 140 from above, and the anti-dislodgement protrusions 24 are interlocked with the lower ends of the inner surfaces of the outer side walls 136. Thus, the bus bars 21 are held in an anti-dislodgement state within the bus bar holding units 132 (see FIG. 18 and FIG. 19).

Also, the locking walls 137 of adjacent coupling units 131 are locked within a recess 25, and thus adjacent coupling units 131 are coupled to each other. At this stage, the coupling units 131 are expandable in the coupling direction thereof (the X-axis direction) because the coupling units 131 coupled to each other have clearances between the recesses 25 and the locking walls 137. In other words, the resin protectors 130, each formed with a plurality of coupling units 131, are able to accommodate the tolerances in the direction in which the plurality of electric cells 11 are arranged (the X-axis direction) when the resin protectors 130 are attached to the electric cell set 10.

Next, the lower case 170 of the electronic control unit 160 is attached between the pair of resin protectors 130A and 130B assembled in the above-described manner. Specifically, as shown in FIG. 17, the pair of resin protectors 130A and 130B are brought closer to the lower case 170 from both sides of the lower case 170, and are attached thereto such that the interposed sections 142 of the resin protectors 130 are interposed between the pressing pieces 181 and the receiving pieces 182 of the lower case 170 (see FIG. 18). At this stage, the locking pieces 183 of the lower case 170 are inserted into the slits 143 of the coupling units 131 while being elastically deformed, and elastically recover when the locking protrusions 183A at the tips thereof have passed through the upper ends of the slits 143. Thus, the locking pieces 183 are interlocked with the upper edge portions of the slits 143 (see FIG. 20). Consequently, as shown in FIG. 23, the lower case 170 and the pair of resin protectors 130A and 130B are integrated into one piece.

At this stage, the lower case 170 is provided with clearances that allow the lower case 170 to move in the front-rear direction (the X-axis direction) relative to the resin protectors 130. That is to say, the lower case 170 is attached to the resin protectors 130 so as to be able to move within the range corresponding to the above-described clearances in the direction along the coupling direction of the coupling units 131 (the X-axis direction) relative to the resin protectors 130 because, as shown in FIG. 21, the width of the slits 143 in the X-axis direction is designed to be larger than the width of the locking pieces 183 in the X-axis direction.

As described above, while the resin protectors 130 and the lower case 170 are attached to each other, the positioning members 185, each formed by integrating the connection pieces 154 of a plurality of voltage detection bus bars 150 into one piece, are placed underneath the detection circuit substrate 190, as shown in FIG. 22. Then, the connection sections 158 of the voltage detection bus bars 150 are brought to penetrate through the predetermined through holes 191 of the detection circuit substrate 190, and soldered thereto. Thus, the voltage detection bus bars 150 and the detection circuit substrate 190 are connected (see FIG. 23).

Next, the main portions 151 of the voltage detection bus bars 150 that have been integrated with and connected to the detection circuit substrate 190 are inserted from above, into predetermined bus bar holding units 132 out of the plurality of bus bar holding units 132 of the resin protectors 130 (the coupling units 131) that have been integrated with the lower case 170, and are placed on the bus bars 21. At this stage, as shown in FIG. 24, the base end sections 155 of the connection pieces 154 of the voltage detection bus bars 150 and portions of the tolerance accommodating sections 156 are housed within the gaps S1 formed between the inner side walls 135 and the support walls 144.

The main portions 151 of the voltage detection bus bars 150 are housed within the bus bar holding units 132 while coming into press-contact with the inner surfaces of the outer side walls 136 via the press-contact pieces 153. At this stage, the main portions 151 are inserted while elastically deforming the holding pieces 140 of the bus bar holding units 132 using the lower surfaces thereof, and when the main portions 151 have passed through the lower ends of the holding pieces 140, the main portions 151 are prevented by the holding pieces 140 that have elastically recovered, from dislodging upward. In this way, the main portions 151 of the voltage detection bus bars 150 placed on the bus bars 21 are brought into a stable anti-dislodgement state (see FIG. 19).

Figure 24:
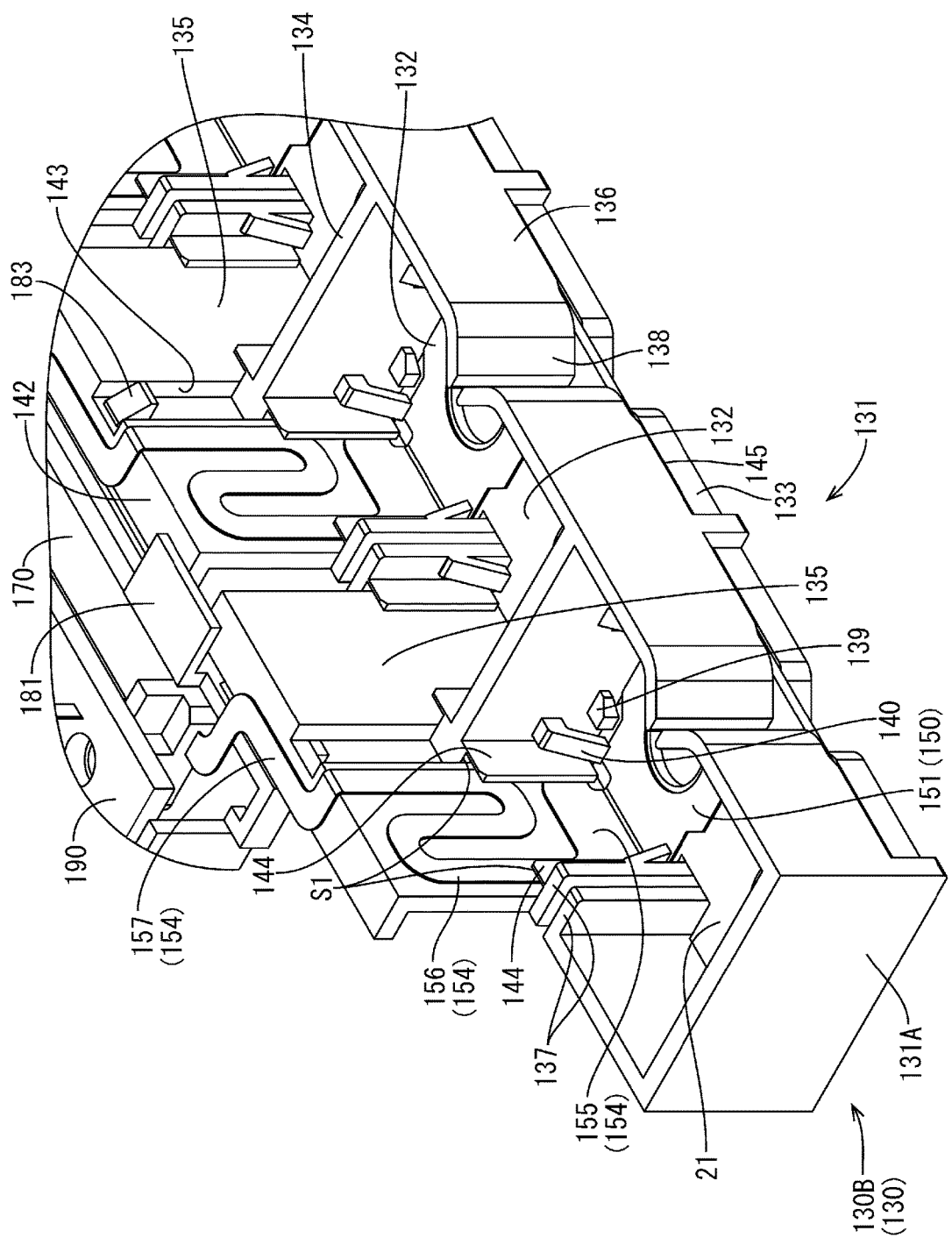
FIG. 24 is a partially-enlarged perspective view showing a situation in which the voltage detection bus bars have been housed in the resin protectors.
Figure 25:
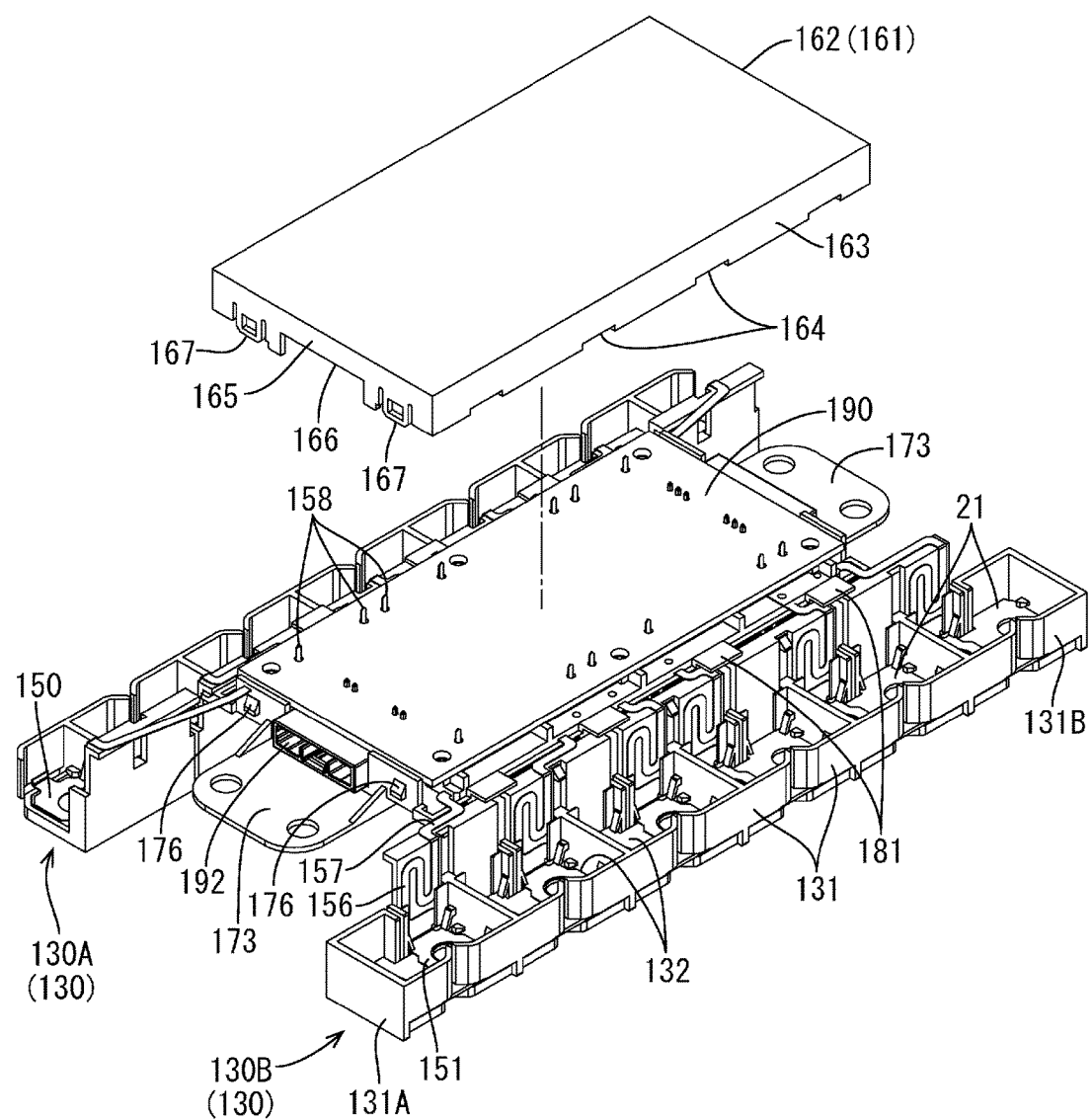
FIG. 25 is a perspective view showing a process in which an upper case is attached to the lower case.

Also, in the situation where the voltage detection bus bars 150 are placed on the bus bars 21, the tolerance accommodating sections 156 of the connection pieces 154 of the voltage detection bus bars 150 are in the state of extending along the inner surfaces of the inner side walls 135 due to the support walls 144, and the lead-out sections 157 are in the state of being placed on the upper surfaces of the interposed sections 142 (see FIG. 24).

Also, the connector sections 192 provided on the lower surface of the detection circuit substrate 190 are placed on the upper surface of the dent section 172 of the lower case 170, and the positioning members 185 are respectively placed on both sides of the dent section 172. Consequently, the detection circuit substrate 190 is brought into the state of being mounted on the bottom section 171 of the lower case 170 (see FIG. 25).

Next, the upper case 162 is brought closer to, and attached to, the lower case 170 from above the detection circuit substrate 190. Specifically, the locking pieces 167 of the upper case 162 are interlocked with the locking protrusions 176 of the lower case 170, the upper case 162 and the lower case 170 are thus integrated into one piece, and the electronic control unit 160 within which the detection circuit substrate 190 is housed is complete. Also, the battery wiring module 120 into which the resin protectors 130 and the electronic control unit 160 are integrated is complete (see FIG. 15).

Note that, at this stage, the electronic control unit 160 is provided with clearances that allow the lower case 170 to move in the front-rear direction (the X-axis direction) relative to the resin protectors 130 as described above, and thus the electronic control unit 160 is attached so as to be relatively movable in the front-rear direction within the range corresponding to the above-described clearances.

Next, the duct 195 is arranged on the upper surface 10A of the electric cell set 10 so as to cover the gas discharge sections 16, the electric cell set 10 having been arranged such that the electrodes 12 face upward, and the battery wiring module 120 is attached to the duct 195 from above. Specifically, the battery wiring module 120 is brought closer to the duct 195 from above, and the attaching protrusions 199 of the duct 195 are brought to penetrate through the fixing holes 174 of the first fixing sections 173 of the lower case 170. Simultaneously, the electrode posts 14 are brought to penetrate through the terminal through holes 22 of the bus bars 21 and the terminal insertion holes 152 of the voltage detection bus bars 150. Then, the nuts 18 are screwed onto the attaching protrusions 199 and the electrode posts 14 so that the case 161 and the duct 195 are fixed and adjacent positive and negative electrodes 12 are connected, and thus the battery module is complete.

The following describes the actions and the potential advantageous effects of the present embodiment.

In the battery wiring module 120 according to the present embodiment, the locking pieces 183 of the lower case 170 of the electronic control unit 160 are provided with clearances in the slits 143 of the resin protectors 130 (the coupling units 131), and the electronic control unit 160 is attached to and integrated with the resin protectors 130 so as to be movable in the direction in which the electric cells 11 are lined up. Therefore, the resin protectors 130 can be attached to the electric cell set 10 so as to be able to accommodate the tolerances, without being restricted by the electronic control unit 160 from moving.

Also, according to the present embodiment, the voltage detection bus bars 150 and the electronic control unit 160 are connected by the connection pieces 154 that are provided integrally with the voltage detection bus bars 150. The connection piece 154 have tolerance accommodating sections 156 that can accommodate the tolerances in the direction in which the electric cells 11 are lined up, and therefore the voltage detection bus bars 150 and the electronic control unit 160 are not restricted by the connection pieces 154 from moving relative to each other.

Also, the tolerance accommodating sections 156 are formed together with the main portions 151 by punch-processing a metal plate material, and can be easily manufactured.

Furthermore, the plurality of voltage detection bus bars 150 are configured to be attachable to the detection circuit substrate 190 all at once via the positioning members 185 that can hold the connection pieces 154 lined up at predetermined positions. Therefore, it is possible to obtain a battery wiring module 120 that is advantageous in terms of assembly workability.

Other Embodiments

The present invention is not limited to the embodiments described by way of the above descriptions and drawings, and embodiments such as the following are also encompassed in the technical scope of the present invention.

(1) Although the embodiments above show configurations in which the electronic control units 60 and 160 and the resin protectors 30 and 130 are interlocked with each other using the locking pieces 64 and 183, the locking holes 44, and the slits 143, the locking means are not limited to those in the embodiments above.

(2) Also, although the embodiments above show configurations in which the cases 61 and 161 of the electronic control units 60 and 160 are provided with the locking pieces 64 and 183 and the resin protectors 30 and 130 are provided with the locking holes 44 and the slits 143, the cases 61 and 161 may be provided with locking holes or slits, and the resin protectors 30 and 130 may be provided with locking pieces.

Figure 26:
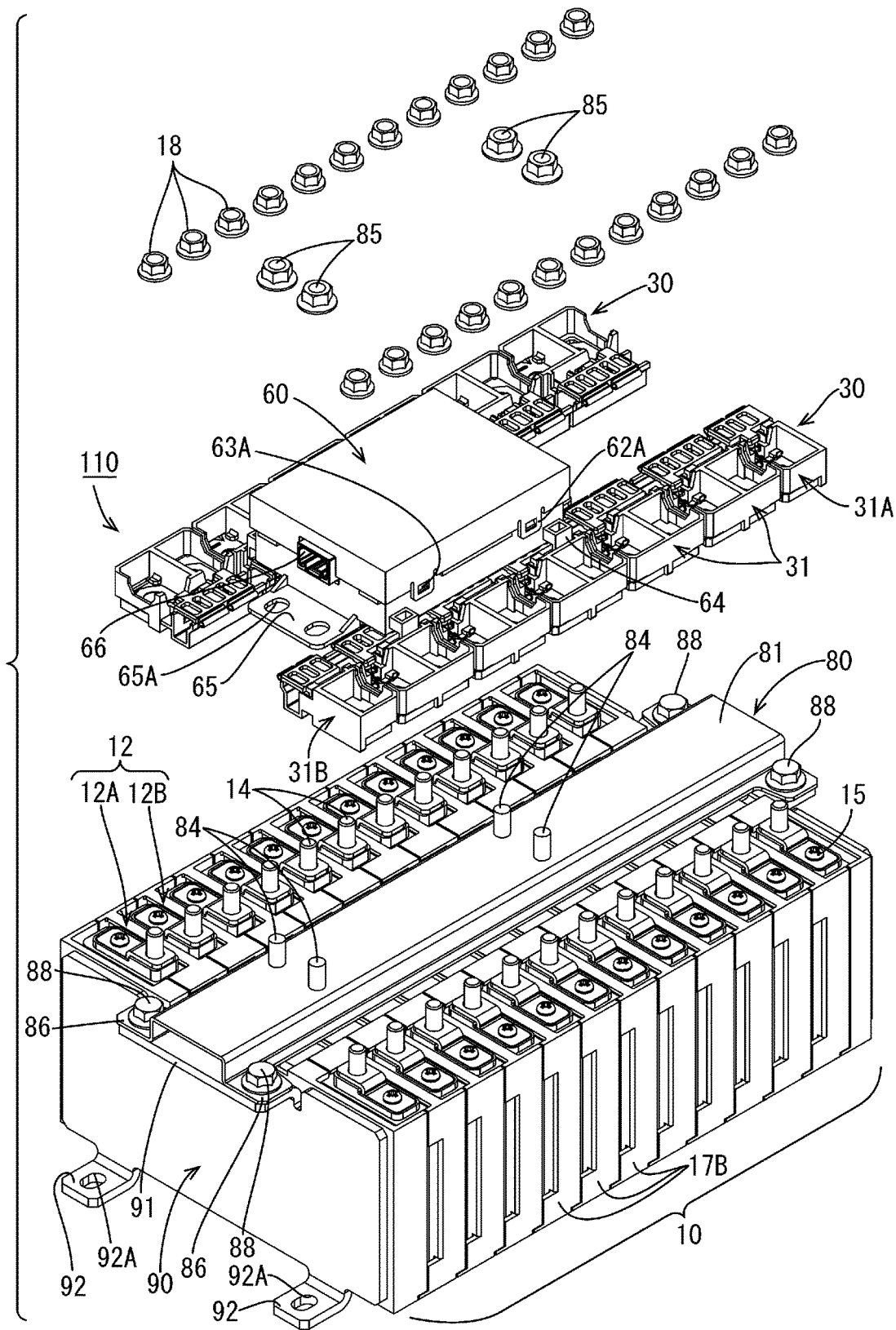
FIG. 26 is an exploded perspective view of a battery module according to another embodiment.

(3) Although the embodiments above show battery wiring modules 20 and 100 that are provided integrally with the ducts 70 and 80, the battery wiring modules 20 and 100 are not necessarily provided with a duct. Alternatively, as shown in FIG. 26, the duct 80 may have been attached to the electric cell set 10 in advance, and the battery wiring module 110 may be attached to the electric cell set 10 to which the duct 80 has been attached.

(4) Although the tolerance accommodating sections 156 of the voltage detection bus bars 150 in the third embodiment above are each configured with a plate material that has been punched out so as to have approximately a Z-shape with two curved portions, the tolerance accommodating sections 156 are not limited to those in the embodiment above, and may be modified as appropriate.

(5) Although the third embodiment shows a configuration in which the connection pieces 154 of the plurality of voltage detection bus bars 150 are formed integrally with the positioning members 185 and are attached to the detection circuit substrate 190 all at once, the positioning members 185 are not always necessary, and the voltage detection bus bars 150 may be individually attached to the detection circuit substrate 190 one by one.

(6) In the embodiments, the electric cells 11 are adopted as electricity storage elements. Well-known secondary batteries, such as nickel-metal hydride batteries or lithium-ion batteries, may be used as the electric cells 11. Also, electricity storage elements are not limited to the electric cells 11, and any sorts of electricity storage elements such as capacitors and condensers may be used as appropriate.

REFERENCE SIGNS LIST

M, m: battery module
10: electric cell set (electricity storage element set)
11: electric cell (electricity storage element)
12: electrode
12A: positive electrode
12B: negative electrode
13: metal terminal (electrode terminal)
14: electrode post
16: gas discharge section
20, 100, 110, 120: battery wiring module
21: bus bar (connection member)
30, 130: resin protector (holding member)
31, 131: coupling unit
32, 132: bus bar holding section (holding section)
33: peripheral wall
40: electric wire housing groove
44: locking hole (locking section)
50: voltage detection terminal (detection member)
60, 160: electronic control unit
61, 161: case
64, 183: locking piece
64D: claw section
65: attaching section
65A: attaching hole
68: circuit substrate (detection circuit, detection circuit substrate)
70, 80, 195: duct
74, 84: attaching protrusion
143: slit (locking section)
150: voltage detection bus bar (detection member)
151: main portion
154: connection piece
156: tolerance accommodating section
185: positioning member
190: detection circuit substrate

The invention claimed is:

1. A wiring module that is attachable to an electricity storage element set including a plurality of electricity storage elements that are lined up in a line-up direction and that have positive and negative electrode terminals, the wiring module comprising:
   a connection member for electrically connecting the electrode terminals of adjacent electricity storage elements out of the plurality of electricity storage elements to each other;
   a holding member that is made of insulating resin, that has a holding section for holding the connection member, and that is attachable to the electricity storage element set; and
   an electronic control unit for detecting a state of at least one electricity storage element out of the plurality of electricity storage elements, wherein
   the holding member is configured to accommodate a tolerance in the line-up direction of the plurality of electricity storage elements, and
   the electronic control unit is attached to the holding member so as to be movable in the line-up direction relative to the holding member.

2. The wiring module according to claim 1,
   wherein the electronic control unit includes a detection circuit that is housed in a case, the detection circuit being configured to detect a state of at least one of the plurality of electricity storage elements,
   the case and the holding member are attached to each other with a locking piece and a locking section, the locking piece being provided on one of the case and the holding member, and the locking section being provided on the other of the case and the holding member, and
   a clearance is provided between the locking piece and the locking section, the clearance allowing the case and the holding member to move relative to each other in the line-up direction.

3. The wiring module according to claim 2, further comprising:
   a duct for allowing gas that is generated inside at least one of the plurality of electricity storage elements to flow and for discharging the gas to the outside,
   wherein the electronic control unit is fixed to the duct.

4. The wiring module according to claim 1, further comprising:
   a duct for allowing gas that is generated inside at least one of the plurality of electricity storage elements to flow and for discharging the gas to the outside,
   wherein the electronic control unit is fixed to the duct.

5. The wiring module according to claim 4,
   wherein the duct is configured to be attachable to the electricity storage element set.

6. The wiring module according to claim 1, further comprising:
   a plurality of detection members each having: a main portion that is placed on one of the connection members; and a connection piece that is provided integrally with the main portion, and that is connected to the electronic control unit,
   wherein the connection piece has a tolerance accommodating section for accommodating a tolerance in the line-up direction of the plurality of electricity storage elements.

7. The wiring module according to claim 6,
   wherein the tolerance accommodating section is formed together with the main portion by punch-processing a plate material.

8. The wiring module according to claim 7,
   wherein the electronic control unit is provided with a detection circuit substrate on which a detection circuit is formed that is configured to detect a state of at least one of the plurality of electricity storage elements, and
   the plurality of detection members are attached to the detection circuit substrate all at once with a positioning member that is configured to hold the connection pieces lined up at predetermined positions.

9. The wiring module according to claim 6,
   wherein the electronic control unit is provided with a detection circuit substrate on which a detection circuit is formed that is configured to detect a state of at least one of the plurality of electricity storage elements, and
   the plurality of detection members are attached to the detection circuit substrate all at once with a positioning member that is configured to hold the connection pieces lined up at predetermined positions.

* * * * *